(12) United States Patent
Wang et al.

(10) Patent No.: US 11,790,497 B2
(45) Date of Patent: Oct. 17, 2023

(54) IMAGE ENHANCEMENT METHOD AND APPARATUS, AND STORAGE MEDIUM

(71) Applicant: TENCENT TECHNOLOGY (SHENZHEN) COMPANY LIMITED, Shenzhen (CN)

(72) Inventors: Ruixing Wang, Shenzhen (CN); Xin Tao, Shenzhen (CN); Xiaoyong Shen, Shenzhen (CN); Jiaya Jia, Shenzhen (CN); Yuwing Tai, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 301 days.

(21) Appl. No.: 17/324,336

(22) Filed: May 19, 2021

(65) Prior Publication Data

US 2021/0272236 A1 Sep. 2, 2021

Related U.S. Application Data

(63) Continuation of application No. PCT/CN2020/075472, filed on Feb. 17, 2020.

(30) Foreign Application Priority Data

Feb. 28, 2019 (CN) .......................... 201910148574.6

(51) Int. Cl.
*G06T 5/00* (2006.01)
*G06N 3/08* (2023.01)
(Continued)

(52) U.S. Cl.
CPC ............ *G06T 5/008* (2013.01); *G06F 18/213* (2023.01); *G06F 18/22* (2023.01); *G06N 3/08* (2013.01);
(Continued)

(58) Field of Classification Search
None
See application file for complete search history.

(56) References Cited

U.S. PATENT DOCUMENTS

2010/0303372 A1* 12/2010 Zhao ........................ H04N 5/21
382/254
2017/0256033 A1* 9/2017 Tuzel .................... G06T 3/4046

FOREIGN PATENT DOCUMENTS

CN 101102398 A * 1/2008
CN 108021933 A * 5/2018 ............. G06K 9/627
(Continued)

OTHER PUBLICATIONS

X. Guo, Y. Li and H. Ling, "LIME: Low-Light Image Enhancement via Illumination Map Estimation," in IEEE Transactions on Image Processing, vol. 26, No. 2, pp. 982-993, Feb. 2017, doi: 10.1109/TIP.2016.2639450.*
(Continued)

*Primary Examiner* — Jiangeng Sun
(74) *Attorney, Agent, or Firm* — Crowell & Moring, L.L.P.

(57) ABSTRACT

Embodiments of this disclosure include an image enhancement method and apparatus. The image enhancement may include obtaining an original image and performing synthesis processing on features of the original image to obtain a first illumination map corresponding to the original image. A resolution of the first illumination map may be lower than a resolution of the original image. The image enhancement may further include obtaining, based on the first illumination map, a mapping relationship between an image to an illumination map and performing mapping processing on the original image based on the mapping relationship to obtain a second illumination map. A resolution of the second illumination map may be equal to the resolution of the original image. The image enhancement may further include
(Continued)

performing image enhancement processing on the original image according to the second illumination map to obtain a target image.

20 Claims, 7 Drawing Sheets

(51) Int. Cl.
  *G06T 3/40* (2006.01)
  *G06T 5/50* (2006.01)
  *G06F 18/22* (2023.01)
  *G06F 18/213* (2023.01)

(52) U.S. Cl.
  CPC ............ *G06T 3/4046* (2013.01); *G06T 5/001* (2013.01); *G06T 5/50* (2013.01); *G06T 2207/20016* (2013.01); *G06T 2207/20081* (2013.01); *G06T 2207/20084* (2013.01)

(56) References Cited

FOREIGN PATENT DOCUMENTS

| CN | 108305236 | A | * | 7/2018 | ............ | G06N 3/0454 |
| CN | 108764250 | A | * | 11/2018 | ............ | G06K 9/4604 |
| CN | 109003231 | | | 12/2018 | | |
| CN | 109086656 | A | * | 12/2018 | ......... | G06K 9/00624 |
| CN | 109102468 | | | 12/2018 | | |
| CN | 109102483 | | | 12/2018 | | |
| CN | 109345485 | | | 2/2019 | | |
| CN | 109919869 | | | 6/2019 | | |
| WO | WO-2019232831 | A1 | * | 12/2019 | ......... | G06K 9/00697 |

OTHER PUBLICATIONS

Xutong Ren, Mading Li, Wen-Huang Chengand Jiaying Liu1, "Joint Enhancement and Denoising Method via Sequential Decomposition", arXiv: 1804.08468v3 [cs.CV] Apr. 28, 2018.*

Chen Wei, Wenjing Wang, Wenhan Yang, Jiaying Liu, "Deep Retinex Decomposition for Low-Light Enhancement", arXiv: 1808.04560v1 [cs.CV] Aug. 14, 2018.*

Jae Sung Park, Nam Ik Cho, "Generation of High Dynamic Range Illumination from a Single Image for the Enhancement of Undesirably Illuminated Images", arXiv:1708.00636v1 [cs.CV] Aug. 2, 2017.*

S. Park, S. Yu, M. Kim, K. Park and J. Paik, "Dual Autoencoder Network for Retinex-Based Low-Light Image Enhancement," in IEEE Access, vol. 6, pp. 22084-22093, 2018, doi: 10.1109/ACCESS.2018.2812809.*

International Search Report issued in International Application No. PCT/CN2020/075472 dated May 21, 2020, with English translation.

* cited by examiner

IMAGE ENHANCEMENT METHOD AND APPARATUS, AND STORAGE MEDIUM

CROSS-REFERENCE TO RELATED APPLICATIONS

This application is a continuation application of PCT Patent Application No. PCT/CN2020/075472, entitled "IMAGE ENHANCEMENT METHOD AND APPARATUS, AND STORAGE MEDIUM" filed on Feb. 17, 2020, which claims priority to Chinese Patent Application No. 201910148574.6, entitled "IMAGE ENHANCEMENT METHOD AND APPARATUS, AND STORAGE MEDIUM" filed with the National Intellectual Property Administration, PRC on Feb. 28, 2019, wherein the content of each of the above-referenced applications is incorporated herein by reference in its entirety.

FIELD OF THE TECHNOLOGY

This application relates to the field of image processing, and specifically, to an image enhancement method and apparatus, and a storage medium.

BACKGROUND OF THE APPLICATION

In recent years, with the improvement of photographing technologies of electronic devices, requirements on the image quality have also increased. Underexposure caused by insufficient light or backlight affects the quality of an image, frustrates an effort to capture desired details, and may lead to other problems. Therefore, an image enhancement method may be used to improve the image quality. In the current image enhancement method, a network model is trained using pairs of original images and annotated images, to obtain a network model that can enhance an image, but this method has low efficiency in training the network model.

SUMMARY

In view of this, embodiments of this disclosure provide an image enhancement method and apparatus, and a storage medium, which can improve the efficiency of image enhancement.

In a first aspect, an embodiment of this disclosure provides an image enhancement method. The method may include obtaining an original image and performing synthesis processing on features of the original image to obtain a first illumination map corresponding to the original image. A resolution of the first illumination map may be lower than a resolution of the original image. The method may further include obtaining, based on the first illumination map, a mapping relationship between an image and an illumination map and performing mapping processing on the original image based on the mapping relationship to obtain a second illumination map. A resolution of the second illumination map may be equal to the resolution of the original image. The method may further include performing image enhancement processing on the original image according to the second illumination map to obtain a target image.

In a second aspect, an embodiment of this disclosure provides an image enhancement apparatus. The image enhancement apparatus may include a memory operable to store computer-readable instructions and a processor operable to read the computer-readable instructions. The processor when executing the computer-readable instructions may be configured to obtain an original image and perform synthesis processing on features of the original image to obtain a first illumination map corresponding to the original image. A resolution of the first illumination map may be lower than a resolution of the original image. The processor may further be configured to obtain, based on the first illumination map, a mapping relationship between an image and an illumination map and perform mapping processing on the original image based on the mapping relationship to obtain a second illumination map. A resolution of the second illumination map may be equal to the resolution of the original image. The processor may be further configured to perform image enhancement processing on the original image according to the second illumination map to obtain a target image.

In a third aspect, an embodiment of this disclosure provides a non-transitory computer-readable storage medium storing processor executable instructions. The instructions may cause a processor to obtain an original image and perform synthesis processing on features of the original image to obtain a first illumination map corresponding to the original image. A resolution of the first illumination map may be lower than a resolution of the original image. The processor may further be configured to obtain, based on the first illumination map, a mapping relationship between an image and an illumination map and perform mapping processing on the original image based on the mapping relationship to obtain a second illumination map. A resolution of the second illumination map may be equal to the resolution of the original image. The processor may be further configured to perform image enhancement processing on the original image according to the second illumination map to obtain a target image.

In the embodiments of this disclosure, an original image is obtained; synthesis processing is performed on features of the original image to obtain a first illumination map corresponding to the original image, a resolution of the first illumination map being lower than a resolution of the original image; a mapping relationship for mapping an image to a second illumination map is obtained based on the first illumination map; mapping processing is performed on the original image based on the mapping relationship to obtain a second illumination map, a resolution of the second illumination map being equal to the resolution of the original image; and image enhancement processing is performed on the original image according to the second illumination map to obtain a target image. This solution can improve the efficiency of image enhancement.

BRIEF DESCRIPTION OF THE DRAWINGS

To describe the technical solutions in the embodiments of this disclosure more clearly, the following briefly describes the accompanying drawings required for describing the embodiments. Apparently, the accompanying drawings in the following description show merely some embodiments of this disclosure, and a person in the art may still derive other drawings from these accompanying drawings without creative efforts.

DESCRIPTION OF EMBODIMENTS

Figure 1:
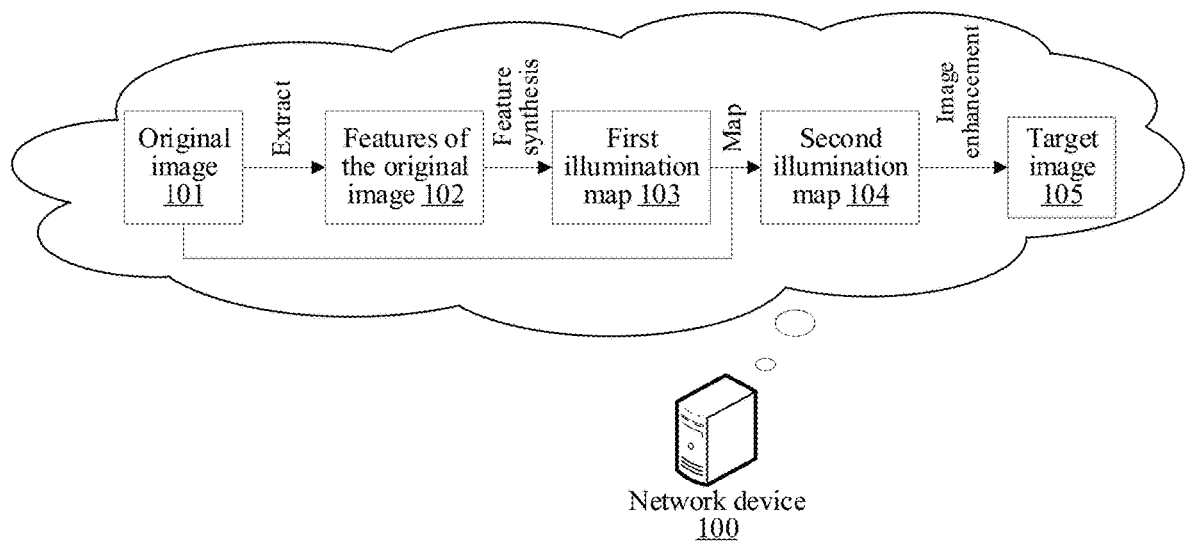
FIG. 1 is a schematic diagram of an application scenario of an image enhancement method according to an embodiment of this disclosure.

Referring to the drawings, same component symbols represent same components. A principle of this disclosure is described using examples in which this disclosure is implemented in proper computing environments. The following descriptions are specific embodiments of this disclosure based on the examples, and are not to be construed as a limitation to other specific embodiments of this disclosure that are not described herein in detail.

In the following description, the specific embodiments of this disclosure are described with reference to steps and symbols of operations that are performed by one or more computers, unless indicated otherwise. Therefore, such steps and operations, which are at times referred to as being computer-executed, include the manipulation by the processing unit of the computer of electrical signals representing data in a structured form. This manipulation transforms the data or maintains the data at locations in the memory system of the computer, which reconfigures or otherwise alters the operation of the computer in a manner well understood by a person skilled in the art. Data structures in which the data is maintained are physical locations of the memory that have particular properties defined by the format of the data. However, while the principle of this disclosure is being described in the foregoing text, it is not meant to be limiting as a person skilled in the art will appreciate that the various steps and operations described hereinafter may be implemented in hardware.

The term "module" (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In this disclosure, the terms "first", "second", "third", and the like are intended to distinguish between different objects but do not indicate a particular order. In addition, the terms "include", "have", and any variant thereof are intended to cover a non-exclusive inclusion. For example, a process, method, system, product, or device that includes a series of steps or modules is not limited to the listed steps or modules. Instead, some embodiments further include a step or module that is not listed, or some embodiments further include another step or module that is intrinsic to the process, method, product, or device.

"Embodiment" mentioned in the specification means that particular features, structures, or characteristics described with reference to the embodiment may be included in at least one embodiment of this disclosure. The term appearing at different positions of the specification may not refer to the same embodiment or an independent or alternative embodiment that is mutually exclusive with another embodiment. A person skilled in the art explicitly or implicitly understands that the embodiments described in the specification may be combined with other embodiments.

An embodiment of this disclosure provides an image enhancement method. The image enhancement method may be performed by an image enhancement apparatus provided in an embodiment of this disclosure, or a network device integrated with the image enhancement apparatus. The image enhancement apparatus may be implemented in manner of hardware or software. The network device may be a device such as a smartphone, a tablet computer, a palmtop computer, a notebook computer, or a desktop computer.

FIG. 1 is a schematic diagram of an application scenario of an image enhancement method according to an embodiment of this disclosure. FIG. 1 takes the image enhancement apparatus being integrated in the network device 100 as an example. The network device 100 can obtain an original image 101; perform synthesis processing on features 102 of the original image 101 to obtain a first illumination map 103 corresponding to the original image 101, a resolution of the first illumination map 103 being lower than a resolution of the original image 101; obtain, based on the first illumination map 103, a mapping relationship for mapping an image to a second illumination map 104; perform mapping processing on the original image 101 based on the mapping relationship to obtain a second illumination map 104, a resolution of the second illumination map 104 being equal to the resolution of the original image 101; and perform image enhancement processing on the original image 101 according to the second illumination map 104 to obtain a target image 105.

Figure 2:
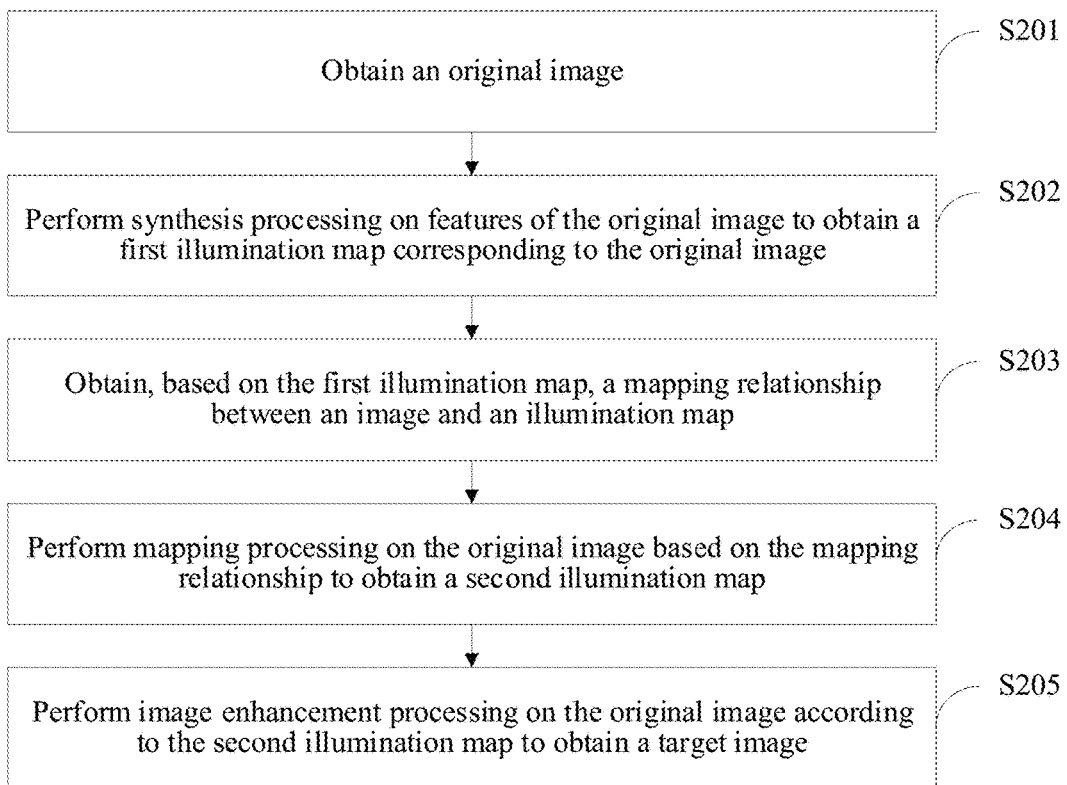
FIG. 2 is a first schematic flowchart of an image enhancement method according to an embodiment of this disclosure.

FIG. 2 is a schematic flowchart of an image enhancement method according to an embodiment of this disclosure. Referring to FIG. 2, the image enhancement method according to an embodiment of this disclosure is as follows.

201: Obtain an original image.

The original image is an image that needs image enhancement. Original images may be images obtained in a variety of image capturing situations. For example, the original image may be a normally exposed image, an underexposed image, an image with insufficient light, or a backlit image during image capturing. Content included in the original image is not limited.

Due to the diversification of image capturing situations of the original images, the image enhancement method can perform image enhancement on the original images in a variety of image capturing situations, and is not limited to image enhancement for the normally exposed image, thereby expanding the application scope of the image enhancement method.

There are many ways to obtain the original image. For example, the original image may be obtained from local storage, a network side device, or the like.

In an embodiment, for example, when imaged are captured by a camera device, a currently captured image may be selected as the original image. In another example, when images are captured by a camera device and displayed in an image capture interface (such as an image preview interface), an image currently displayed on the interface may be cropped as the original image.

In an embodiment, the original image may alternatively be obtained from a local or external storage unit. For example, the original image may alternatively be obtained from a local image database.

The image enhancement can enhance useful information in an image to correspondingly improve the visual effect of the image for an application scenario of the image. The image enhancement can sharpen an originally unclear image by purposefully emphasizing a global feature or local feature of the image. Alternatively, the image enhancement can enlarge a difference between features of different objects in an image by emphasizing features of interest. Alternatively, the image enhancement can meet requirements of special analyses by suppressing features not of interest, improving image quality, enriching image information, and enhancing image interpretation and recognition effects.

202: Perform synthesis processing on features of the original image to obtain a first illumination map corresponding to the original image.

Figure 5:
FIG. 5 is a second illumination map according to an embodiment of this disclosure.

As shown in FIG. 5, an illumination map is a shadow map after decomposition of an intrinsic image. An intrinsic image includes a reflectance image and a shading image obtained by decomposing an original image. The shading image is an image that reflects lighting conditions of the original image, and the reflectance image refers to an image part that remains unchanged under changing lighting conditions, that is, an image obtained after highlight is removed from the original image.

A resolution of the first illumination map is lower than a resolution of the original image. The first illumination map may be an image form of an illumination map with one resolution. The first illumination map may be an illumination map with a resolution lower than a resolution of the original image. For example, the first illumination map may be a low-resolution illumination map.

The image resolution represents the amount of information stored in an image, and may be expressed by the quantity of pixels per inch in the image.

Currently, when the deep learning method is used to enhance an image, a network model obtained by regression learning from an original image to an annotated image is usually used to perform an image enhancement operation. However, this method leads to low learning efficiency and poor robustness of the network model, and defects in image contrast.

In an embodiment, an image enhancement network model obtained by regression learning from an original image to an illumination map may be used to perform the image enhancement operation. The image enhancement network model obtained by regression learning from the original image to the illumination map has high learning efficiency and strong robustness, and facilitates further operations on the image.

The image enhancement method is applicable to the image enhancement network model. The image enhancement network model uses a mapping relationship between the original image and the illumination map to replace a mapping relationship between the original image and the annotated image. The advantage of this approach is that the mapping between the original image and the illumination map usually has a relatively simple form and is known a priori. The image enhancement network model thus has a strong generalization ability, and can effectively process original images obtained in different situations under complex photography conditions.

In practical applications, the first illumination map corresponding to the original image may be obtained through feature synthesis. For example, features of the original image may be extracted first, and feature synthesis is performed on the extracted features to generate the first illumination map.

In an embodiment, for example, features of the original image may be extracted using a network structure including a convolution operation.

In the traditional method, the method of adjusting a distribution curve of an image histogram is usually used to enhance the image globally. However, this method causes problems such as locally over-brightness, over-exposure, and over-darkness, and the color of the generated image may not be very bright.

In addition, to enhance an underexposed image, it is necessary to adjust local features (such as contrast, detail definition, shadow and highlight) and global features (such as color distribution, average brightness, scenario category) of the image at the same time. Therefore, the accuracy of image enhancement can be improved by separately extracting the local features and global features of the original image.

In an embodiment, specifically, the step of performing synthesis processing on features of the original image to obtain a first illumination map corresponding to the original image may include:

extracting a local feature and a global feature of the original image based on a convolutional network; and performing feature synthesis on the local feature and the global feature to obtain the first illumination map corresponding to the original image.

The convolutional network is a network structure that can extract features of an image. For example, a convolutional network may include a convolutional layer, and the convolutional layer can extract features of an image through a convolution operation.

The local feature of the image is a local expression of an image feature, and the local feature of the image can reflect a local characteristic of the image. For example, local features of an image may include contrast, detail definition, shadow, highlight, and the like.

The global feature of the image can represent an overall feature of the image. The global feature is relative to the local feature and may be used to describe an overall feature such as a color or shape of an image or a target. For example, global features of an image may include color distribution, average brightness, scenario category, and the like.

In practical applications, for example, an original image may be inputted into a convolutional network to extract a local feature and a global feature of the original image, and then feature synthesis is performed on the extracted local feature and global feature to obtain a first illumination map.

To improve the accuracy of image feature extraction, a network model may be used to extract image features.

In an embodiment, specifically, the step of extracting a local feature and a global feature of the original image based on a convolutional network may include:

inputting the original image to the convolutional network;

performing a convolution operation on the original image based on the primary feature extraction network to extract a primary feature of the original image;

performing a convolution operation on the primary feature based on the local feature extraction network to extract the local feature; and performing a convolution operation on the primary feature based on the global feature extraction network to extract the global feature.

Figure 6:
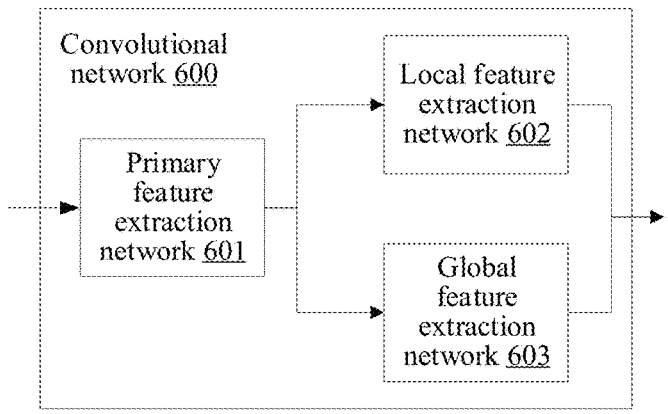
FIG. 6 is a schematic structural diagram of a convolutional network according to an embodiment of this disclosure.

As shown in FIG. 6, the convolutional network 600 may include a primary feature extraction network 601, a local feature extraction network 602, and a global feature extraction network 603, the local feature extraction network 602 being connected in parallel with the global feature extraction network 603, and being connected in series with the primary feature extraction network 601.

The primary feature extraction network 601 is a network model that can extract a primary feature of an original image. For example, the primary feature extraction network 601 may include a pre-trained VGG16 network model. The VGG16 network model may include a 16-layer structure. For example, the VGG16 network model may include a convolutional layer, a fully connected layer, a pooling layer, and the like.

In an embodiment, a convolution operation may be performed on the original image based on the pre-trained VGG16 network model to extract the primary feature of the original image. For example, the original image can be inputted into the VGG16 network model, and the convolution operation can be performed through the convolution layer. Each time the image is scanned through a convolution kernel, a new matrix is generated. After that, the size of a parameter matrix is reduced through the pooling layer, thereby reducing the quantity of parameters in the final fully connected layer. Then the primary feature of the original image is extracted through the fully connected layer.

In an embodiment, according to actual conditions, other types of network models including several convolutional layers may be selected to perform a convolution operation on the original image to extract the primary feature of the original image.

The local feature extraction network 602 is a network model that can extract a local feature of an image. For example, the local feature extraction network 602 may include two convolutional layers, and the convolutional layer may be used to extract a local feature. The global feature extraction network 603 is a network model that can extract a global feature. For example, the global feature extraction network 603 may include two convolutional layers and three fully connected layers, and the convolutional layer may be used to extract a global feature.

In practical applications, for example, an original image can be inputted into the primary feature extraction network 601 to extract a primary feature of the original image. Then, the primary feature is inputted at the same time into the local feature extraction network 602 and the global feature extraction network 603 that are connected in parallel, to extract a local feature and a global feature.

To process a high-resolution image in real time, most network calculations may be performed in a low resolution condition. For example, a resolution of an image may be converted by downsampling.

In an embodiment, specifically, the step of performing synthesis processing on features of the original image to obtain a first illumination map corresponding to the original image may include:

downsampling pixels of the original image to obtain an input image; and performing synthesis processing on features of the input image to obtain the first illumination map corresponding to the original image.

The image may be scaled down by downsampling so that the image fits the size of a display region, and a thumbnail of the corresponding image is generated. For example, for an image with a size of m*n, a low-resolution image with a size of (m/s)*(n/s) can be obtained by performing downsampling with a sampling rate of s on the image, where s is a common divisor of m and n. When considering image pixels in a matrix form, the downsampling of the image is to turn image pixels in an s*s window into one image pixel. The value of the pixel may be an average value of all image pixels in the s*s window, or the value of the pixel may be obtained by other calculation methods according to actual situations.

In practical applications, for example, a matrix with a preset size of s*s may be obtained from a matrix composed of pixels of the original image, and then the pixels in the matrix with the preset size may be converted into one pixel. The pixel may be obtained according to a preset rule. For example, the pixel may be an average value of all pixels in the matrix with the preset size. After the pixels of the entire original image are converted, an input image whose resolution after downsampling is lower than the resolution of the original image can be obtained. After that, the input image may be inputted into the convolutional network for feature extraction, and subsequent steps may be performed.

203: Obtain, based on the first illumination map, a mapping relationship for mapping an image to a second illumination map.

A resolution of the second illumination map is equal to the resolution of the original image. The second illumination map may be an image form of an illumination map with one resolution. As shown in FIG. 5, the second illumination map may be an illumination map with the same resolution as the original image. For example, the second illumination map may be referred to as an original-resolution illumination map.

The mapping relationship may map an image to an illumination map. For example, an original image may be mapped to the second illumination map through the mapping relationship. For example, the mapping relationship may be a matrix mapping relationship, that is, a mapping transformation matrix. Mapping transformation between images may be implemented through such a mapping relationship. For example, mapping transformation may be performed on an original image according to the mapping transformation matrix to obtain a second illumination map.

In practical applications, the mapping relationship may be obtained based on the first illumination map.

To improve the accuracy of image enhancement, the mapping relationship may be obtained based on the first illumination map in a bilateral grid manner.

In an embodiment, specifically, the step of obtaining a mapping relationship based on the first illumination map may include:

sampling pixels of the first illumination map to obtain sampled pixels; and mapping the sampled pixels to a bilateral grid to obtain the mapping relationship.

The bilateral grid is a way of sampling a spatial domain and a brightness domain of the image and mapping the image to the grid. The term "bilateral" in the bilateral grid means space and brightness. After discrete processing, coordinates and brightness information of each point in the image are rounded to the corresponding grid. Through filtering and other processing in the grid, combined with interpolation by the method of upsampling, a processed image can be obtained.

For example, spatial-domain and range-domain sampling may be performed on the pixels of the first illumination map, to obtain the sampled pixels. Then positions of the corresponding pixels in the grid are found, and a grid difference operation is performed to obtain the mapping transformation matrix.

In an embodiment, specifically, the step of obtaining, based on the first illumination map, a mapping relationship for mapping an image to a second illumination map may include: obtaining, using a preset training image and a sample enhanced image corresponding to the training image, the mapping relationship that enables loss information between a predicted enhanced image corresponding to the training image and the sample enhanced image to meet a preset condition, the predicted enhanced image being an enhanced image obtained by performing mapping processing on the training image using the mapping relationship.

In some embodiments, the loss information may be at least one of a contrast loss information, a smoothness loss information, or a color loss information.

The contrast loss information may be obtained by calculating an Euclidean distance between the predicted enhanced image and the sample enhanced image, or may be obtained by calculating a Euclidean distance between the training image and a restored image. The restored image refers to an image obtained by performing inverse mapping (that is, removing the enhancement effect) on the sample enhanced image using the mapping relationship.

The smoothness loss information may be obtained by summing spatial variations (for example, variations in directions of the space) of values of three color channels at each pixel of the mapping relationship.

The color loss information may be obtained by summing similarities between color vectors of each pixel in the predicted enhanced image and in the sample enhanced image. The color vector refers to a vector composed of color components (for example, R, G, and B components) of each pixel.

By simultaneously optimizing each color channel of the image, the effect of image enhancement can be improved.

204: Perform mapping processing on the original image based on the mapping relationship to obtain a second illumination map.

To improve the accuracy of image enhancement, mapping processing may be performed on the original image in a bilateral grid manner.

In an embodiment, specifically, the step of performing mapping processing on the original image based on the mapping relationship to obtain a second illumination map may include:

performing mapping processing on the original image based on the mapping relationship to obtain a mapped image; and upsampling the mapped image to obtain the second illumination map.

The principle of bilateral grid upsampling is to select a reference image, perform spatial-domain and range-domain sampling on pixels in any space of the reference image, then find positions of the pixels in the grid, and calculate a brightness of an unknown range using a method of trilinear interpolation.

Figure 7:
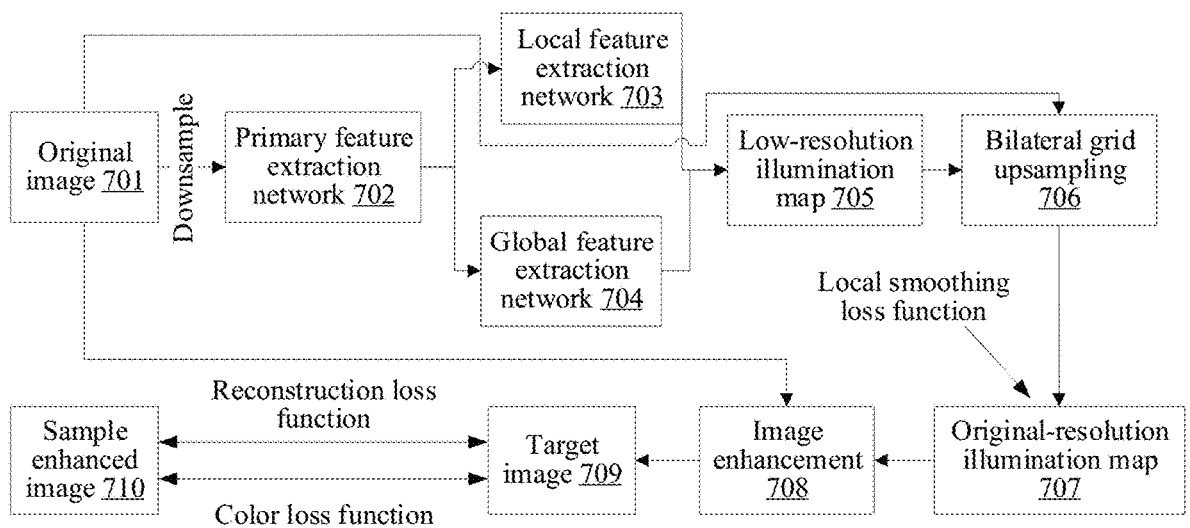
FIG. 7 is a schematic flowchart of image enhancement according to an embodiment of this disclosure.

In practical applications, for example, as shown in FIG. 7, a mapping transformation matrix may be obtained according to the first illumination map, and then mapping processing may be performed on the original image 701 using the mapping transformation matrix to obtain a mapped image, which is an image with a lower resolution than the original image 701. After that, bilateral grid upsampling 706 may be performed on the mapped image, and based on pixels of the mapped image, a suitable interpolation algorithm is used to interpolate new elements between the pixels to obtain the second illumination map.

205: Perform image enhancement processing on the original image according to the second illumination map to obtain a target image.

The target image may be an image obtained after the image enhancement.

The problem of image enhancement can be regarded as a problem of finding a mapping relationship between the original image and the target image. For example, $\hat{I}$ may be used to represent a matrix corresponding to the target image, I may be used to represent a matrix corresponding to the original image, and a function F may be used to represent a mapping function between the original image and the target image. Then the mapping function F may be expressed by the following formula:

$$\hat{I} = F(I)$$

The target image, the original image, and the second illumination map are related to each other. For example, S may be used to represent a matrix corresponding to the second illumination map, $\hat{I}$ may be used to represent the matrix corresponding to the target image, and I may be used to represent the matrix corresponding to the original image. Then the relationship among the target image, the original image, and the second illumination map can be shown as follows:

$$I = S * \hat{I}$$

Therefore, the target image can be obtained according to the original image and the second illumination map. According to the original image I and the second illumination map S, the obtained target image $\hat{I}$ can be shown in the following formula:

$$F(I) = S^{-1} \cdot I$$

In an embodiment, for example, as shown in FIG. 7, the original image 701 may be obtained first, and the original image 701 may be downsampled to obtain an input image of 256×256 pixels. Then the input image is inputted into the primary feature extraction network 702 including the pre-trained VGG16 network model to extract the primary feature of the original image 701, then the primary feature is inputted separately into the local feature extraction network 703 and the global feature extraction network 704 that are connected in parallel, and the local feature and the global feature are extracted and merged to obtain the first illumination map. Then, the mapping relationship is obtained through bilateral grid upsampling 706, and the second illumination map is obtained according to the mapping relationship. Finally, the target image 709 is obtained through the formula I=S* $\tilde{I}$. The process of image enhancement 708 can be accelerated by this image enhancement method, thereby improving the efficiency of image enhancement.

Figure 3:
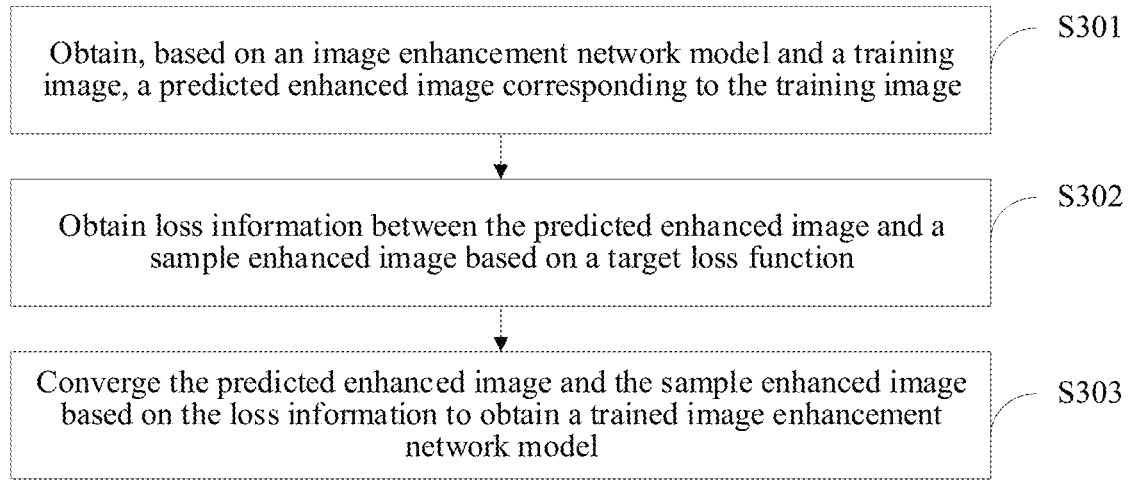
FIG. 3 is a second schematic flowchart of an image enhancement method according to an embodiment of this disclosure.

In an embodiment, the image enhancement method may further include a training process of an image enhancement network model. As shown in FIG. 3, the image enhancement method may further include the following procedure.

301: Obtain, based on an image enhancement network model and a training image, a predicted enhanced image corresponding to the training image.

The training image may be an image used by the network model in the training process, and the training image includes a sample enhanced image. The sample enhanced image is an annotation related to image enhancement performed on the training image.

There are many ways to obtain the training image. For example, the training image can be obtained from local storage or a network side device, or may be taken by an image capture device.

There are many ways to annotate the training image. For example, the training image may be annotated by an expert to obtain the sample enhanced image.

The predicted enhanced image may be an image obtained after the training image is enhanced by a network model. There may be a difference between the predicted enhanced image and the actual sample enhanced image, but the difference can be reduced by training the network model.

In practical applications, for example, the training image may be inputted into the image enhancement network model to obtain the predicted enhanced image corresponding to the training image. The image enhancement method for enhancing a training image through the image enhancement network model is equal to the image enhancement method for enhancing an original image through the image enhancement network model, which has been described above and is not repeated here.

In an embodiment, it is also possible to increase the diversity of training samples by randomly cropping a training image. For example, alternatively, the training image may be randomly cropped into a plurality of images of 512×512 pixels to increase the diversity of samples.

The accuracy of the network model can be improved by increasing the diversity of the training image. The training image may include images in various image capturing situations, such as an image of normal exposure, underexposure, insufficient light, or backlight. The network model trained based on such training images can adapt to images obtained in different capturing situations in reality.

In an embodiment, for example, by obtaining a standard condition dataset and a special condition dataset, training images including a plurality of image capturing types may be constructed according to the standard condition dataset and the special condition dataset.

The standard condition dataset is a dataset that includes normally exposed images. For example, the standard condition dataset may be a MIT-Adobe Five K Dataset, which includes a plurality of images in raw format taken by a group of different photographers with a single-lens reflex (SLR) camera, which means that all information recorded by the camera sensor will be saved. The images cover a wide range of scenes, subjects and lighting conditions. Afterwards, the captured images are retouched with dedicated image adjustment software to obtain the standard condition dataset.

In an embodiment, for example, the standard condition dataset may be the MIT-Adobe Five K Dataset, and annotations of Expert C may be selected as annotations of the training samples in the dataset. However, because the standard condition dataset is created mainly to enhance general images rather than underexposed images, the standard condition dataset only includes a small portion (about 4%) of unexposed images. As a result, the standard condition dataset lacks images taken in special image capturing conditions, such as images captured at night or images obtained under non-uniform lighting conditions. To increase the diversity of samples, a special condition dataset may be introduced.

The special condition dataset is a dataset that includes abnormally exposed images. For example, the special condition dataset may include images captured in special image capturing conditions, such as underexposure, insufficient light, or backlight. Such a special condition dataset may include various image capturing situations, scenes, themes, and styles. The added special condition dataset can supplement image types that the standard condition dataset lacks.

For example, a camera may be used to capture an image with a resolution of 6000×4000, and then about 15% of images may be collected from an image sharing database using "underexposure", "insufficient light", "backlight" and the like as keywords for searching. After that, the expert use graphics tool software to retouch each collected image to obtain corresponding reference images and establish the special condition dataset. Finally, the images in the dataset may be randomly divided into two subsets, where 2750 images are used for network model training, and 2750 images are used for network model testing.

Training the network model based on the training images constructed by the standard condition dataset and the special condition dataset can make the trained network model adapt to various image capturing situations, thereby improving the accuracy of image enhancement.

302: Obtain loss information between the predicted enhanced image and a sample enhanced image based on a target loss function.

The loss information may include one or more of contrast loss information, color loss information, and smoothness loss information. The loss information may represent a difference between the predicted enhanced image and the sample enhanced image. The difference may be reduced by training the network model.

The loss function can be used to estimate the degree of inconsistency between a predicted value and a true value of the network model. A smaller value of the loss function indicates better robustness of the network model.

In practical applications, for example, the loss information between the predicted enhanced image and the sample enhanced image may be obtained through the target loss function. The loss information may be a difference between the predicted enhanced image and the sample enhanced image, and may be reduced by training the network model.

The target loss function may be flexibly set according to actual application requirements. At present, an image is usually enhanced by adjusting an illumination map of the image and performing local smoothing optimization operations on the illumination map. However, such a method may leave traces of manual changes of the halo and cause local overexposure of the image, resulting in excessive image enhancement.

In an embodiment, therefore, a target loss function may be designed, and the target loss function may include one or more of a reconstruction loss function, a local smoothing loss function, and a color loss function. By constraining the illumination map, the image is not over-exposed or over-enhanced.

Specifically, the image enhancement method may further include:
obtaining, based on the image enhancement network model and a training image, a predicted enhanced image corresponding to the training image;
obtaining contrast loss information between the predicted enhanced image and a sample enhanced image based on a reconstruction loss function, the sample enhanced image being an enhanced image corresponding to the training image; and
converging the predicted enhanced image and the sample enhanced image based on the contrast loss information to obtain a trained image enhancement network model.

The reconstruction loss function may be used to obtain the contrast loss information of the image. For example, the reconstruction loss function may be obtained by measuring a Euclidean distance error. That is, a Euclidean distance between the predicted enhanced image generated by the image enhancement network model and the sample enhanced image annotated by the expert is calculated.

The Euclidean distance is a straight-line distance between two points in Euclidean space.

In an embodiment, for example, the reconstruction loss function may be obtained according to a Euclidean distance error metric. For example, S may be used to represent an original-resolution illumination map matrix corresponding to the predicted enhanced image, $\hat{I}_i$ may be used to represent the sample enhanced image, and $I_i$ may be used to represent the training image. The original-resolution illumination map matrix S corresponding to the predicted enhanced image may be multiplied by the sample enhanced image $\hat{I}_i$ to calculate the Euclidean distance error metric with the training image $I_i$ to obtain the reconstruction loss function. A formula of the reconstruction loss function $L_r^i$ may be as follows:

$$L_r^i = \|I_i - S \times \hat{I}_i\|^2$$

A multi-channel illumination range may be $(I_i)_c \leq (S)_c \leq 1$, all pixel channels in the sample enhanced image $\hat{I}_i$ and the training image $I_i$ are normalized to [0, 1]. $(\ )_{c \in \{r,g,b\}}$ represents a pixel color channel, and may include three pixel color channels: red, green, and blue (RGB). Because $F(I_i) = S^{-1} \times I_i$, $I_i$ may be set as the lower limit of S to ensure that the upper limit of all color channels of $F(I_i)$ after image enhancement is 1, so as to prevent the color from exceeding the color gamut. Setting 1 as the upper limit of S can avoid erroneously darkening an underexposed region.

In an embodiment, the constraint range of the illumination map in the reconstruction loss function may further be adjusted to meet the actual needs of different situations. For example, different constraints may be added to S to adjust the lighting and the color brightness of the image.

By using the reconstruction loss function, the enhanced image obtained can be clearer and the contrast of the image can be better. However, if the target loss function only includes the reconstruction loss function, there is still the risk of failing to correctly generate contrast details and accurate colors of an image.

Therefore, in an embodiment, a local smoothing loss function may further be added to the target loss function to improve the accuracy of image enhancement.

Specifically, the image enhancement method may further include:
obtaining, based on the image enhancement network model and a training image, a predicted enhanced image corresponding to the training image;
obtaining smoothness loss information between the predicted enhanced image and a sample enhanced image based on a local smoothing loss function, the sample enhanced image being an enhanced image corresponding to the training image; and
converging the predicted enhanced image and the sample enhanced image based on the smoothness loss information to obtain a trained image enhancement network model.

In the traditional method, an image is usually enhanced by adjusting a histogram distribution curve of the image and performing local smoothness on an illumination map of an optimized image. However, in such a method, image enhancement is usually performed using a single-channel illumination map, which leads to deviations in the control of the image color and deficiency in image color enhancement.

Therefore, the three channels, namely, RGB, of the image may be optimized at the same time, and the illumination map may be learned using the learning ability of the network model, to improve the accuracy of image enhancement.

A local smoothing loss function can obtain the smoothness loss information of the image, and the local smoothing loss function may be obtained by summing the three channels of an image pixel.

In practical applications, the local smoothing loss function may be obtained by summing the three channels of an image pixel. For example, p may be used to represent an image pixel, S may be used to represent an illumination map, and a formula for calculating the local smoothing loss function $L_s^i$ may be as follows:

$$L_s^i = \sum_p \sum_c \omega_{x,c}^p (\partial_x S_p)_c^2 + \omega_{y,c}^p (\partial_y S_p)_c^2$$

The three channels of the pixel may be summed to obtain the local smoothing loss function $L_s^i$, $\partial_x$ and $\partial_y$ may be used to represent partial derivatives of horizontal and vertical directions of the image space, and $\omega_{x,c}^p$ and $\omega_{y,c}^p$ may be used to represent smoothness weights of a spatial change of the three channels of the pixel. A formula for calculating and $\omega_{x,c}^p$ and $\omega_{y,c}^p$ may be as follows:

$$\omega_{x,c}^p = (|\partial_x L_i^p|_c^\theta + \varepsilon)^{-1} \omega_{y,c}^p = (|\partial_y L_i^p|_c^\theta + \varepsilon)^{-1}$$

$L_i$ is a logarithmic image of a training image $I_i$, $\theta = 1.2$ is a parameter that controls image sensitivity, and $\varepsilon$ is a constant, usually set to 0.0001 to prevent division by zero.

Training the network model using the local smoothing loss function can reduce overfitting, improve the generalization ability of the network model, and restore good image contrast and clearer details in the image.

In an embodiment, although the Euclidean distance of the chromatic aberration has been implicitly measured in the reconstruction loss function, the Euclidean distance measurement can only measure the chromatic aberration numerically, but cannot guarantee that the color vectors are consistent in direction, which may result in a noticeable color mismatch. To accurately restore the color information in the image, a color loss function may further be introduced.

Specifically, the image enhancement method may further include:

obtaining, based on the image enhancement network model and a training image, a predicted enhanced image corresponding to the training image;

obtaining color loss information between the predicted enhanced image and a sample enhanced image based on a color loss function, the sample enhanced image being an enhanced image corresponding to the training image; and converging the predicted enhanced image and the sample enhanced image based on the color loss information to obtain a trained image enhancement network model.

The color loss function can obtain color loss information of an image. For example, the color loss function may be obtained by calculating an included angle formed by vectors of the three channels of a pixel of the image.

In practical applications, the color loss function may be obtained according to an included angle formed by vectors of the three channels of a pixel of an image. For example, the color loss function can make colors between the sample enhanced image and the predicted enhanced image obtained by the network model correspond to each other. For the predicted enhanced image and the sample enhanced image, the RGB value of the image may be regarded as a spatial vector, so as to calculate the included angle between the corresponding color channel vectors of the predicted enhanced image and the sample enhanced image. A smaller included angle indicates that directions of the vectors are closer.

In an embodiment, for example, $F(I_i)$ may be used to represent the predicted enhanced image, $I_i^{\%}$ may be used to represent the sample enhanced image, and a formula for calculating the color loss function may be as follows:

$$L_c^i = \sum_p L\left((F(I_i))_p, (I_i^{\%})_p\right)$$

In an embodiment, the target loss function may include a reconstruction loss function, a local smoothing loss function, and a color loss function. For example, $L_r^i$ may be used to represent the reconstruction loss function, $L_s^i$ may be used to represent the local smoothing loss function, $L_c^i$ may be used to represent the color loss function, and L may be used to represent the target loss function. $\omega_r$ may be used to represent a weight of the reconstruction loss function in training, $\omega_s$ may be used to represent a weight of the local smoothing loss function in training, and $\omega_c$ may be used to represent a weight of the color loss function in training. A formula for calculating the target loss function may be as follows:

$$L = \sum_{i=1}^{N} \omega_r L_r^i + \omega_s L_s^i + \omega_c L_c^i$$

In an embodiment, for example, during the image enhancement network model training process, $\omega_r=1$, $\omega_s=2$, and $\omega_c=3$.

303: Converge the predicted enhanced image and the sample enhanced image based on the loss information to obtain a trained image enhancement network model.

In practical applications, the predicted enhanced image and the sample enhanced image may be converged based on the loss information to obtain a trained image enhancement network model.

In an embodiment, for example, a loss function may be used to converge the predicted enhanced image and the sample enhanced image, and continuous training may be performed by reducing the error between the predicted enhanced image and the sample enhanced image, to adjust the weight to an appropriate value. Then the trained image enhancement network model can be obtained.

Training the network model through the image enhancement method and using the trained network model to enhance the image can speed up the operation of the network, improve the efficiency of image enhancement, and improve the accuracy of image enhancement without compromising the effect of enhancement.

The network model trained by the method can realize the customization of the image enhancement effect by constraining the illumination. For example, the contrast can be enhanced by enhancing the local smooth illumination, setting a preferred exposure level by limiting an illumination degree, and the like.

In an embodiment, the image enhancement method can also adjust the constraints on the illumination map in the loss function, so that the user can adjust the image according to a personal preference, such as the brightness of the image, and the vividness of colors in the image.

In an embodiment, the image enhancement method may also add image denoising processing and supplementary generation processing for completely lost details in the image to obtain a better enhanced image.

Figure 8:
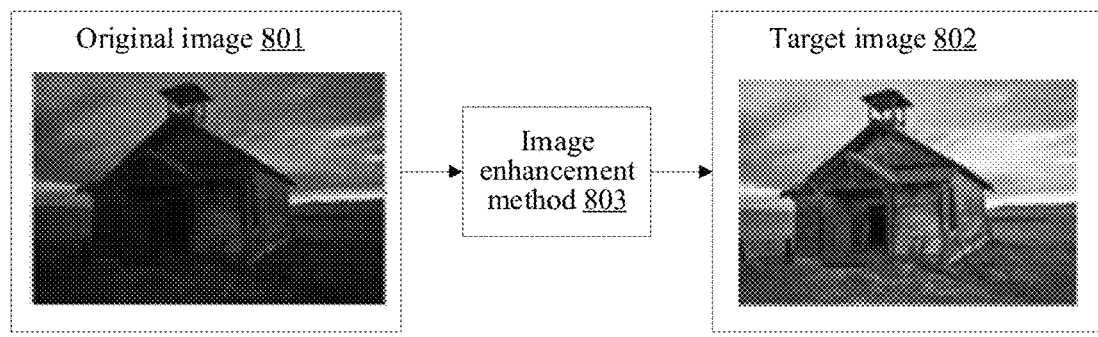
FIG. 8 is a schematic flowchart of input and output of an image enhancement method according to an embodiment of this disclosure.
Figure 9:
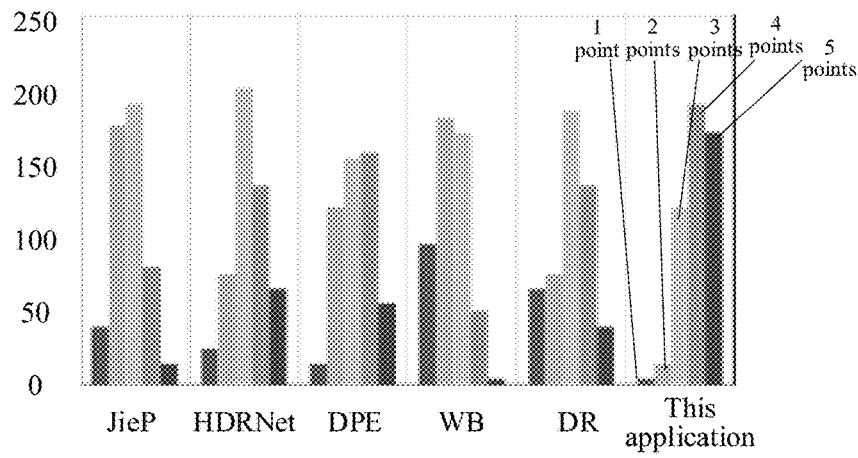
FIG. 9 is a schematic diagram of a first experimental result according to an embodiment of this disclosure.
Figure 10:
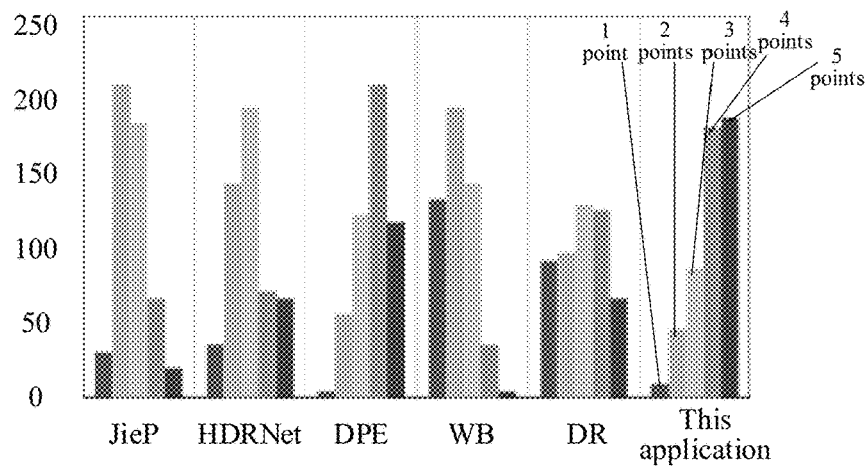
FIG. 10 is a schematic diagram of a second experimental result according to an embodiment of this disclosure.
Figure 11:
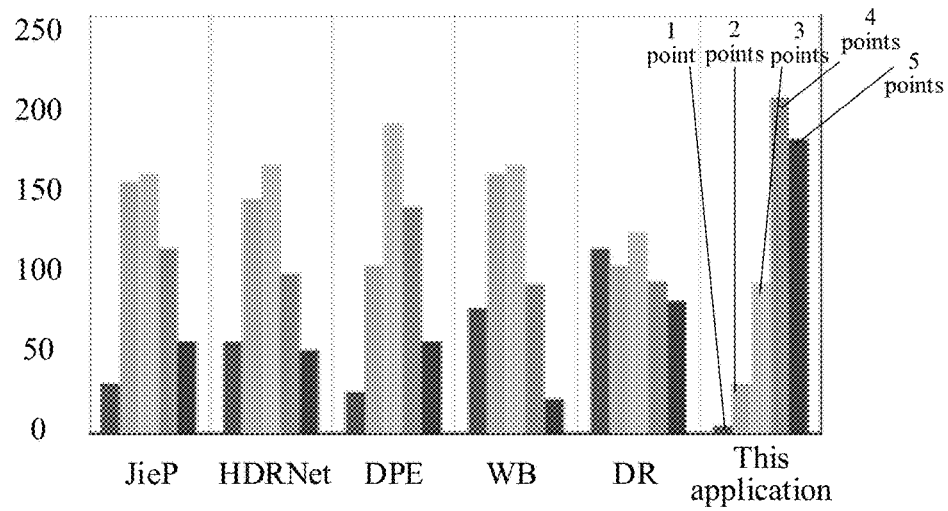
FIG. 11 is a schematic diagram of a third experimental result according to an embodiment of this disclosure.
Figure 12:
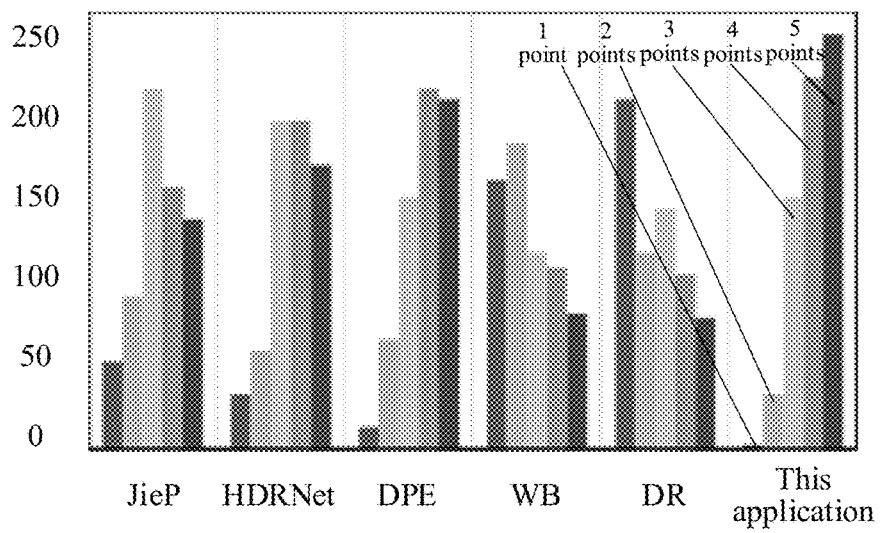
FIG. 12 is a schematic diagram of a fourth experimental result according to an embodiment of this disclosure.
Figure 13:
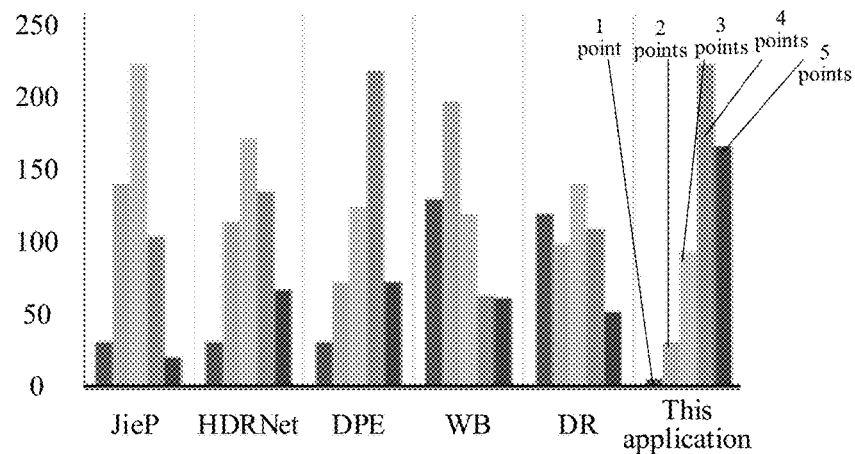
FIG. 13 is a schematic diagram of a fifth experimental result according to an embodiment of this disclosure.
Figure 14:
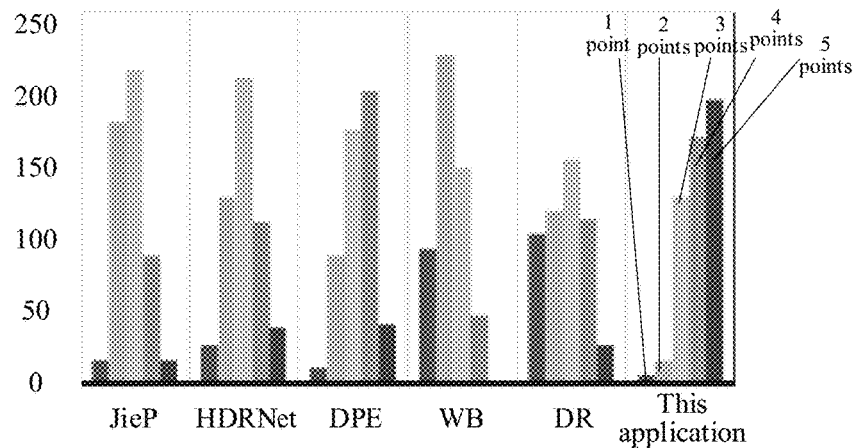
FIG. 14 is a schematic diagram of a sixth experimental result according to an embodiment of this disclosure.

The image enhancement method can be widely used in various image capturing conditions, and the image enhancement method can be used to enhance an image taken during the daytime with insufficient dark light and backlight, or an original image taken at night. The image enhancement method can also resolve the problem of uneven lighting during image capturing. As shown in FIG. 8, the original image may be inputted, and the enhanced target image may be directly obtained using the image enhancement method. For a 1080P high-definition large image, image enhancement processing can also be performed in real time. Therefore, the image enhancement method can further be extended to image enhancement for an image in a video.

The image enhancement method can generate a high-quality image. The enhanced image specifically has clear details, sharp contrast, and moderate exposure. Problems such as local overexposure or over-darkness are avoided and the color of the image is more vivid and beautiful. This image enhancement method can process images of different pixels. For example, a 1080P image can be enhanced in real time, and a 4k-resolution image taken by a single-lens reflex (SLR) camera can also be processed.

In an embodiment, the accuracy of the image enhancement method of this disclosure is compared with five latest image enhancement methods. The five latest image enhancement methods include the Retinex-based image enhancement method JieP, the deep learning-based image enhancement method HDRNet, the deep prior ensemble (DPE), the White-Box, and the Distort-and-Recover. For the foregoing methods, recommended parameters are used for public experiments, and image enhancement results are obtained respectively. The four image enhancement methods based on deep learning are retrained on a special condition dataset and a standard condition dataset. Experimental results show that a correct rate of the image enhancement method of this disclosure is approximately three times that of other methods.

In an embodiment, a visual comparison between the image enhancement method of this disclosure and other image enhancement methods is further performed. Two special images are used for the visual comparison. One is an unevenly exposed image, which includes imperceptible windmill details (the image comes from a special condition dataset), and the other one is an overall low-light image, which includes a small amount of portrait details (the image comes from the standard condition dataset). After the two images are enhanced by different image enhancement methods, the visual comparison is performed. The comparison result shows that the image enhancement method of this disclosure can restore more details in the foreground and background, and obtain better contrast without significantly compromising overexposed or underexposed parts of the image. Secondly, the image enhancement method of this disclosure can display more vivid and natural colors, so that the image effect after image enhancement looks more realistic.

In an embodiment, to evaluate the learning efficiency and generalization ability of the deep learning network model, the peak signal to noise ratio (PSNR) and the structural similarity index (SSIM) can be used to measure the image enhancement methods. To ensure the accuracy of a measurement result, network models of all image enhancement methods are retrained on the special condition dataset and the standard condition dataset. Table 1 shows a comparison of the PSNR and SSIM of the image enhancement methods after retraining on the special condition dataset and the standard condition dataset. Table 2 shows a comparison of the PSNR and SSIM of the image enhancement methods after retraining on the MIT-Adobe Five K Dataset. As shown in Table 1 and Table 2, the image enhancement method of this disclosure is superior to other image enhancement methods, indicating that the image enhancement method of this disclosure is not only applicable to the special condition dataset, but also can be extended to the MIT-Adobe Five K Dataset.

TABLE 1

| Image enhancement method | PSNR | SSIM |
| --- | --- | --- |
| HDRNet | 26.33 | 0.743 |
| DPE | 23.58 | 0.737 |
| White-Box | 21.69 | 0.718 |
| Distort-and-Recover | 24.54 | 0.712 |
| Image enhancement method of this disclosure (excluding reconstruction loss function, local smoothing loss function, and color loss function) | 27.02 | 0.762 |
| Image enhancement method of this disclosure (only including reconstruction loss function) | 28.97 | 0.783 |
| Image enhancement method of this disclosure (only including reconstruction loss function and local smoothing loss function) | 30.03 | 0.822 |
| Image enhancement method of this disclosure (including reconstruction loss function, local smoothing loss function, and color loss function) | 30.97 | 0.856 |

TABLE 2

| Image enhancement method | PSNR | SSIM |
| --- | --- | --- |
| HDRNet | 28.61 | 0.866 |
| DPE | 24.66 | 0.850 |
| White-Box | 23.69 | 0.701 |
| Distort-and-Recover | 28.41 | 0.841 |
| Image enhancement method of this disclosure (excluding reconstruction loss function, local smoothing loss function, and color loss function) | 28.81 | 0.867 |
| Image enhancement method of this disclosure (only including reconstruction loss function) | 29.41 | 0.871 |
| Image enhancement method of this disclosure (only including reconstruction loss function and local smoothing loss function) | 30.71 | 0.884 |
| Image enhancement method of this disclosure (including reconstruction loss function, local smoothing loss function, and color loss function) | 30.80 | 0.893 |

As shown in Table 1 and Table 2, by comparing the image enhancement method of this disclosure that includes three loss functions and the image enhancement method of this disclosure that does not include the three loss functions in the two tables, it is found that the image enhancement method of this disclosure learns a mapping from an image to an illumination map better than an image-to-image mapping. In addition, the tables also show different types of loss functions and the improvement of results, thus proving the role of each loss function.

In an embodiment, user evaluations are further studied to compare the image enhancement methods. First, 100 images are searched out from an image sharing database through keywords such as "City", "Flower", "Food", "Landscape" and "Portrait". Pixel intensity of over 50% of the images is below 0.3. Then a plurality of image enhancement methods are used to perform image enhancement on the images, and participants rate enhancement results corresponding to the image enhancement methods. To ensure the accuracy of the results, the enhancement results are presented to the participants randomly.

As shown in FIG. 9 to FIG. 14, the participants give scores to six questions shown in the drawings, from 1 to 5 points. The six questions are respectively "Is it easy to recognize details in the image?" "Is the image bright-colored?" "Is the resulting image visually real?" "Is the resulting image not overexposed?" "Is the resulting image more attractive than the input image?", and "What is your total score?" Each picture shows the rating of a specific question. The comparison results show that the image enhancement method of this disclosure has achieved a higher score and is favored by users.

It can be known from the above that, in the embodiments of this disclosure, an original image is obtained; synthesis processing is performed on features of the original image to obtain a first illumination map corresponding to the original image, a resolution of the first illumination map being lower than a resolution of the original image; a mapping relationship for mapping an image to a second illumination map is obtained based on the first illumination map; mapping processing is performed on the original image based on the mapping relationship to obtain a second illumination map, a resolution of the second illumination map being equal to the resolution of the original image; and image enhancement processing is performed on the original image according to the second illumination map to obtain a target image. This solution enhances an image by deep learning, which improves the efficiency and accuracy of image enhancement. Regression learning is also performed on the original image and the annotated illumination map to obtain the network model required for image enhancement, which makes the training of the network model easier, strengthens the robustness of the network model, and makes it convenient for further operations on the image. In addition, the three loss functions are designed to improve the accuracy of the enhanced image in terms of color and contrast. By constraining the illumination map in the network model training process, the image is not over-exposed or over-enhanced.

According to the method described in the foregoing embodiments, the following further provides detailed descriptions using an example.

Figure 4:
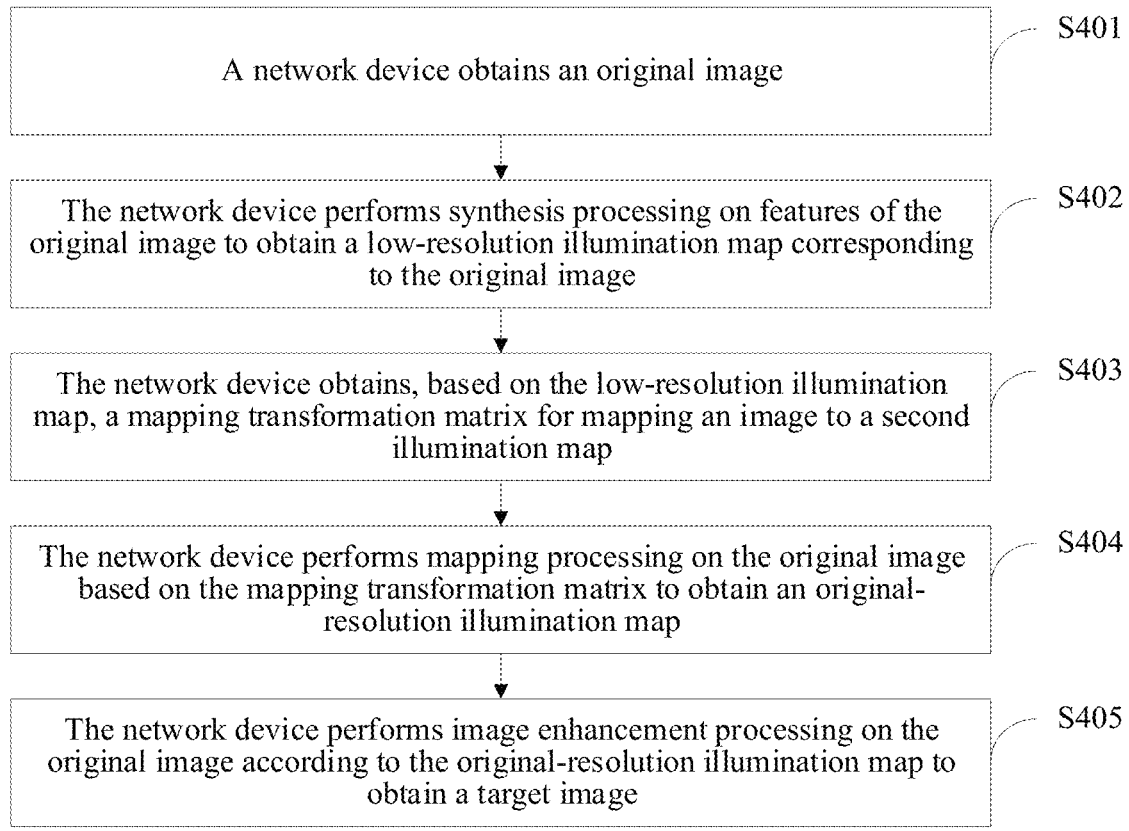
FIG. 4 is a third schematic flowchart of an image enhancement method according to an embodiment of this disclosure.

In this embodiment, as shown in FIG. 4, descriptions are provided using an example in which the image enhancement apparatus is specifically integrated into a network device.

401: A network device obtains an original image.

In practical applications, the network device may obtain original images of various image capturing situations for image enhancement. For example, the original image may be a normally exposed image, an underexposed image, an under-lighted image, or a backlit image during image capturing. The image enhancement method is not limited to the normally exposed image, thereby expanding the application scope of the image enhancement method.

In practical applications, there are many ways for the network device to obtain the original image. For example, the original image may be obtained from local storage, a network side device, or the like.

In an embodiment, for example, when images are captured by a camera device, the network device may select a currently captured image as the original image. In another example, when images are captured by a camera device and displayed in an image capture interface (such as an image preview interface), an image currently displayed on the interface can be cropped as the original image.

In an embodiment, the network device may alternatively obtain the original image from a local or external storage unit. For example, an original image may alternatively be obtained from a local image database.

402: The network device performs synthesis processing on features of the original image to obtain a low-resolution illumination map corresponding to the original image.

Currently, when the deep learning method is used to enhance an image, a network model obtained by regression learning from an original image to an annotated image is usually used to perform an image enhancement operation. However, this method leads to low learning efficiency and poor robustness of the network model, and defects in image contrast.

In practical applications, the network device may perform the image enhancement operation using an image enhancement network model obtained by regression learning from an original image to an illumination map. The image enhancement network model obtained by regression learning from the original image to the illumination map has high learning efficiency and strong robustness, and facilitates further operations on the image.

The image enhancement method is applicable to the image enhancement network model. The image enhancement network model uses a mapping relationship between the original image and the illumination map to replace a mapping relationship between the original image and the annotated image. The advantage of this approach is that the mapping between the original image and the illumination map usually has a relatively simple form and is known a priori. The image enhancement network model thus has a strong generalization ability, and can effectively process original images obtained in different situations under complex photography conditions.

In practical applications, the low-resolution illumination map corresponding to the original image may be obtained through feature synthesis. The network device may first extract features of the original image, and perform feature synthesis on the extracted features to generate the low-resolution illumination map.

In the traditional method, the method of adjusting a distribution curve of an image histogram is usually used to enhance the image globally. However, this method causes problems such as locally over-brightness, over-exposure, and over-darkness, and the color of the generated image may not be very bright.

In addition, to enhance an underexposed image, it is necessary to adjust local features (such as contrast, detail definition, shadow and highlight.) and global features (such as color distribution, average brightness, scenario category.) of the image at the same time. Therefore, the accuracy of image enhancement can be improved by separately extracting the local features and global features of the original image.

In practical applications, the network device may input an original image into a convolutional network to extract a local feature and a global feature of the original image, and then perform feature synthesis on the extracted local feature and global feature to obtain the low-resolution illumination map.

To improve the accuracy of image feature extraction, a network model may be used to extract image features.

As shown in FIG. 6, the convolutional network may include a primary feature extraction network, a local feature extraction network, and a global feature extraction network, the local feature extraction network being connected in parallel with the global feature extraction network, and being connected in series with the primary feature extraction network.

In practical applications, the network device may input the original image into the primary feature extraction network including the pre-trained VGG16 network structure to extract the primary feature of the original image, then the primary feature is inputted at the same time into the local feature extraction network and the global feature extraction network that are connected in parallel, and the local feature and the global feature are extracted. The local feature extraction network includes two convolutional layers, and the global feature extraction network includes two convolutional layers and three fully connected layers.

To process a high-resolution image in real time, most network calculations may be performed in a low-resolution condition, and a resolution of an image may be converted by downsampling.

In practical applications, the network device may obtain a matrix with a preset size of s*s from a matrix composed of pixels of the original image, and then convert the pixels in the matrix with the preset size into one pixel. The pixel may be obtained according to a preset rule. For example, the pixel may be an average value of all pixels in the matrix with the preset size. After the pixels of the entire original image are converted, a downsampled low-resolution input image can be obtained. After that, the low-resolution input image may be inputted into the convolutional network for feature extraction, and subsequent steps may be performed.

403: The network device obtains, based on the low-resolution illumination map, a mapping transformation matrix for mapping an image to a second illumination map.

For example, the network device may perform spatial-domain and range-domain sampling on the pixels of the low-resolution illumination map to obtain the sampled pixels, then find positions of the corresponding pixels in the grid, and perform a grid difference operation to obtain the mapping transformation matrix.

404: The network device performs mapping processing on the original image based on the mapping transformation matrix to obtain an original-resolution illumination map.

To improve the accuracy of image enhancement, mapping processing may be performed on the original image in a bilateral grid manner.

In practical applications, as shown in FIG. 7, the network device may obtain a mapping transformation matrix according to the low-resolution illumination map 705, and then perform mapping processing on the original image 701 using the mapping relationship to obtain a mapped image, which is a low-resolution image. After that, bilateral grid upsampling 706 may be performed on the mapped image, and based on pixels of the mapped image, a suitable interpolation algorithm is used to interpolate new elements between the pixels to obtain the original-resolution illumination map 707.

405: The network device performs image enhancement processing on the original image according to the original-resolution illumination map to obtain a target image.

The problem of image enhancement can be regarded as a problem of finding a mapping relationship between the original image and the target image. $\hat{I}$ may be used to represent a matrix corresponding to the target image, I may be used to represent a matrix corresponding to the original image, and a function F may be used to represent a mapping function between the original image and the target image. Then the mapping function F may be expressed by the following formula:

$$\hat{I} = F(I)$$

The target image, the original image, and the original-resolution illumination map are related to each other. S may be used to represent a matrix corresponding to the original-resolution illumination map, $\hat{I}$ may be used to represent the matrix corresponding to the target image, and I may be used to represent the matrix corresponding to the original image. Then the relationship among the target image, the original image, and the original-resolution illumination map is as follows:

$$I = S * \hat{I}$$

Therefore, the network device can obtain the target image according to the original image and the original-resolution illumination map. According to the original image I and the original-resolution illumination map S, the obtained target image $\hat{I}$ is shown in the following formula:

$$F(I) = S^{-1} \cdot I$$

In practical applications, as shown in FIG. 7, the network device first obtains the original image, and downsamples the original image to obtain a low-resolution input image of 256×256 pixels. Then the low-resolution input image is inputted into the primary feature extraction network 702 including the pre-trained VGG16 network model to extract the primary feature of the original image, then the primary feature is inputted separately into the local feature extraction network 703 and the global feature extraction network 704 that are connected in parallel, and the local feature and the global feature are extracted and merged to obtain the low-resolution illumination map 705. Then, the mapping transformation matrix is obtained through bilateral grid upsampling 706, and the original-resolution illumination map 707 is obtained according to the mapping transformation matrix. Finally, the target image 709 is obtained through the formula $I = S * \hat{I}$. The process of image enhancement 708 can be accelerated by this image enhancement method, thereby improving the efficiency of image enhancement.

In practical applications, the image enhancement method further includes a training process of an image enhancement network model. The image enhancement method further includes the following procedure.

A: The network device obtains, based on an image enhancement network model and a training image, a predicted enhanced image corresponding to the training image.

In practical applications, the network device may input the training image into the image enhancement network model to obtain the predicted enhanced image corresponding to the training image. The image enhancement method for enhancing a training image through the image enhancement network model is equal to the image enhancement method for enhancing an original image through the image enhancement network model, which has been described above and is not repeated here.

In practical applications, the network device may increase the diversity of training samples by randomly cropping the training image. The training image may be randomly cropped into a plurality of images of 512×512 pixels to increase the diversity of samples.

The accuracy of the network model can be improved by increasing the diversity of the training image. The training image may include images in various image capturing situations, such as an image of normal exposure, underexposure, insufficient light, or backlight. The network model trained based on such training images can adapt to images obtained in different capturing situations in reality.

In practical applications, by obtaining a standard condition dataset and a special condition dataset, the network device may construct training images including a plurality of image capturing types according to the standard condition dataset and the special condition dataset. The standard condition dataset is a dataset that includes normally exposed images. The standard condition dataset be the MIT-Adobe Five K Dataset, and annotations of Expert C are selected as annotations of the training samples in the dataset. However, because the standard condition dataset is created mainly to enhance general images rather than underexposed images, the standard condition dataset only includes a small portion (about 4%) of unexposed images. As a result, the standard condition dataset lacks images taken in special image capturing conditions, such as images captured at night or images obtained under non-uniform lighting conditions. To increase the diversity of samples, a special condition dataset is introduced.

The special condition dataset is a dataset that includes abnormally exposed images. For example, the special condition dataset may include images captured in special image capturing conditions, such as underexposure, insufficient light, or backlight. Such a special condition dataset may include various image capturing situations, scenes, themes, and styles. The added special condition dataset can supplement image types that the standard condition dataset lacks.

Training the network model based on the training images constructed by the standard condition dataset and the special condition dataset can make the trained network model adapt to various image capturing situations, thereby improving the accuracy of image enhancement.

B: The network device obtains loss information between the predicted enhanced image and a sample enhanced image based on a target loss function.

In practical applications, the network device may obtain the loss information between the predicted enhanced image and the sample enhanced image through the target loss function. The loss information may be a difference between the predicted enhanced image and the sample enhanced image, and may be reduced by training the network model.

At present, an image is usually enhanced by adjusting an illumination map of the image and performing local smoothing optimization operations on the illumination map. However, such a method may leave traces of manual changes of the halo and cause local overexposure of the image, resulting in excessive image enhancement. Therefore, a target loss function including a reconstruction loss function, a local smoothing loss function, and a color loss function may be designed. By constraining the illumination map, the image is not to be over-exposed or over-enhanced.

In practical applications, the target loss function includes a reconstruction loss function, a local smoothing loss function, and a color loss function. $L_r^i$ is used to represent the reconstruction loss function, $L_s^i$ is used to represent the local smoothing loss function, $L_c^i$ is used to represent the color loss function, and L is used to represent the target loss function. $\omega_r$ is used to represent a weight of the reconstruction loss function in training, $\omega_s$ is used to represent a weight of the local smoothing loss function in training, and $\omega_c$ is used to represent a weight of the color loss function in training. A formula for calculating the target loss function is as follows:

$$L = \sum_{i=1}^{N} \omega_r L_r^i + \omega_s L_s^i + \omega_c L_c^i$$

In practical applications, during the image enhancement network model training process, $\omega_r=1$, $\omega_s=2$, and $\omega_c=3$.

In practical applications, the network device may use S to represent an original-resolution illumination map matrix corresponding to the predicted enhanced image, $\hat{I}_i^e$ to represent the sample enhanced image, and $I_i$ to represent the training image. The network device may multiply the original-resolution illumination map matrix S corresponding to the predicted enhanced image by the sample enhanced image $\hat{I}_i^e$ to calculate a Euclidean distance error metric with the training image $I_i$ to obtain the reconstruction loss function. A formula of the reconstruction loss function $L_r^i$ may be as follows:

$L_r^i = \|I_i - S \times \hat{I}_i^e\|^2$

A multi-channel illumination range may be $(I_i)_c \leq (S)_c \leq 1$, all pixel channels in the sample enhanced image $\hat{I}_i^e$ and the training image $I_i$ are normalized to [0, 1]. $(\ )_{c \in \{r,g,b\}}$ represents a pixel color channel, and may include three pixel color channels: red, green, and blue (RGB). Because $F(I_i) = S^{-1} \times I_i$, $I_i$ may be set as the lower limit of S to ensure that the upper limit of all color channels of $F(I_i)$ after image enhancement is 1, so as to prevent the color from exceeding the color gamut. Setting 1 as the upper limit of S can avoid erroneously darkening an underexposed region.

In practical applications, the network device may further adjust the constraint range of the illumination map in the reconstruction loss function to meet the actual needs of different situations. The network device may add different constraints to S to adjust the brightness, vividness of the colors of the image, and the like.

Using the reconstruction loss function, the enhanced image obtained can be clearer and the contrast of the image can be better. However, if the target loss function only includes the reconstruction loss function, there is still the risk of failing to correctly generate contrast details and accurate colors of an image.

In the traditional method, an image is usually enhanced by adjusting a histogram distribution curve of the image and performing local smoothness on an illumination map of an optimized image. However, in such a method, image enhancement is usually performed using a single-channel illumination map, which leads to deviations in the control of the image color and deficiency in image color enhancement.

Therefore, the three channels, namely, RGB, of the image may be optimized at the same time, and the illumination map may be learned using the learning ability of the network model, to improve the accuracy of image enhancement.

A local smoothing loss function can obtain the smoothness loss information of the image, and the local smoothing loss function can be obtained by summing the three channels of an image pixel.

In practical applications, the network device obtains the local smoothing loss function by summing the three channels of an image pixel. Using p to represent an image pixel and S to represent an illumination map, a formula for calculating the local smoothing loss function $L_s^i$, may be as follows:

$$L_s^i = \sum_p \sum_c \omega_{x,c}^p (\partial_x S_p)_c^2 + \omega_{y,c}^p (\partial_y S_p)_c^2$$

The network device may sum the three channels of the pixel to obtain the local smoothing loss function $L_s^i$, use $\partial_x$ and $\partial_y$ to represent partial derivatives of horizontal and vertical directions of the image space, and use $\omega$hd x,$c^p$ and $\omega$hd y,$c^p$ to represent smoothness weights of a spatial change of the three channels of the pixel. A formula for calculating $\omega$hd x,$c^p$ and $\omega$hd y,$c^p$ may be as follows:

$\omega_{x,c}^p = (|\partial_x L_i^p|_c^\theta + \varepsilon)^{-1} \omega_{y,c}^p = (|\partial_y L_i^p|_c^\theta + \varepsilon)^{-1}$ $L_i$ is a logarithmic image of a training image $I_i$, $\theta=1.2$ is a parameter that controls image sensitivity, and $\varepsilon$ is a constant, usually set to 0.0001 to prevent division by zero.

Training the network model using the local smoothing loss function can reduce overfitting, improve the generalization ability of the network model, and restore good image contrast and clearer details in the image.

Although the Euclidean distance of the chromatic aberration has been implicitly measured in the reconstruction loss function, the Euclidean distance measurement can only measure the chromatic aberration numerically, but cannot guarantee that the color vectors are consistent in direction, which may result in a noticeable color mismatch. To accurately restore the color information in the image, a color loss function may further be introduced.

The color loss function can obtain color loss information of an image. The color loss function may be obtained by calculating an included angle formed by vectors of the three channels of a pixel of the image.

In practical applications, the network device may obtain the color loss function according to an included angle formed by vectors of the three channels of a pixel of an image. For example, the color loss function can make colors between the sample enhanced image and the predicted enhanced image obtained by the network model correspond to each other. For the predicted enhanced image and the sample enhanced image, the RGB value of the image may be regarded as a spatial vector, so as to calculate the included angle between the corresponding color channel vectors of the predicted enhanced image and the sample enhanced image. The smaller the included angle, the closer the directions between the vectors.

In practical applications, $F(I_i)$ is used to represent the predicted enhanced image, $I_i^\%$ is used to represent the sample enhanced image, and a formula for calculating the color loss function $L_c^i$ may be as follows:

$$L_c^i = \sum_p L\left((F(I_i))_p, (I_i^\%)_p\right)$$

C: The network device converges the predicted enhanced image and the sample enhanced image based on the loss information to obtain a trained image enhancement network model.

In practical applications, the network device may converge the predicted enhanced image and the sample enhanced image based on the loss information to obtain a trained image enhancement network model.

In practical applications, the network device may converge the predicted enhanced image and the sample enhanced image using the reconstruction loss function, the local smoothing loss function, and the color loss function. Continuous training may be performed by reducing the error between the predicted enhanced image and the sample enhanced image, to adjust the weight to an appropriate value. Then the trained image enhancement network model can be obtained.

Training the network model through the image enhancement method and using the trained network model to enhance the image can speed up the operation of the network, improve the efficiency of image enhancement, and improve the accuracy of image enhancement without compromising the effect of enhancement.

The network model trained by the method can realize the customization of the image enhancement effect by constraining the illumination. For example, the contrast can be enhanced by enhancing the local smooth illumination, setting a preferred exposure level by limiting an illumination degree, and the like.

In an embodiment, the image enhancement method can also adjust the constraints on the illumination map in the loss function, so that the user can adjust the image according to a personal preference, such as the brightness of the image, and the vividness of colors in the image.

In an embodiment, the image enhancement method may also add image denoising processing and supplementary generation processing for completely lost details in the image to obtain a better enhanced image.

In practical applications, the image enhancement method needs to be provided with a graphics processing unit (GPU) that meets a performance requirement and needs to be configured with the TensorFlow deep learning platform, on which the image enhancement method can be directly operated.

The image enhancement method can be widely used in various image capturing conditions, and the image enhancement method can be used to enhance an image taken during the daytime with insufficient dark light and backlight, or an original image taken at night. The image enhancement method can also resolve the problem of uneven lighting during image capturing. As shown in FIG. 8, the original image may be inputted, and the enhanced target image may be directly obtained using the image enhancement method. For a 1080P high-definition large image, image enhancement processing can also be performed in real time. Therefore, the image enhancement method can further be extended to image enhancement for an image in a video.

The image enhancement method can generate a high-quality image. The enhanced image specifically has clear details, sharp contrast, and moderate exposure. Problems such as local overexposure or over-darkness are avoided and the color of the image is more vivid and beautiful. This image enhancement method can process images of different pixels. For example, a 1080P image can be enhanced in real time, and a 4k-resolution image taken by an SLR camera can also be processed.

It can be learned from the above, in the embodiments of this disclosure, the network device can obtain an original image; perform synthesis processing on features of the original image to obtain a low-resolution illumination map corresponding to the original image; obtain, based on the low-resolution illumination map, a mapping transformation matrix for mapping an image to a second illumination map; perform mapping processing on the original image based on the mapping transformation matrix to obtain an original-resolution illumination map; and perform image enhancement processing on the original image according to the original-resolution illumination map to obtain a target image. This solution enhances an image by deep learning, which improves the efficiency and accuracy of image enhancement. Regression learning is also performed on the original image and the annotated illumination map to obtain the network model required for image enhancement, which makes the training of the network model easier, strengthens the robustness of the network model, and makes it convenient for further operations on the image. In addition, the three loss functions are designed to improve the accuracy of the enhanced image in terms of color and contrast. By constraining the illumination map in the network model training process, the image is not to be over-exposed or over-enhanced.

To better implement the foregoing method, an embodiment of this disclosure further provides an image enhancement apparatus, which may be integrated in a network device.

Figure 15:
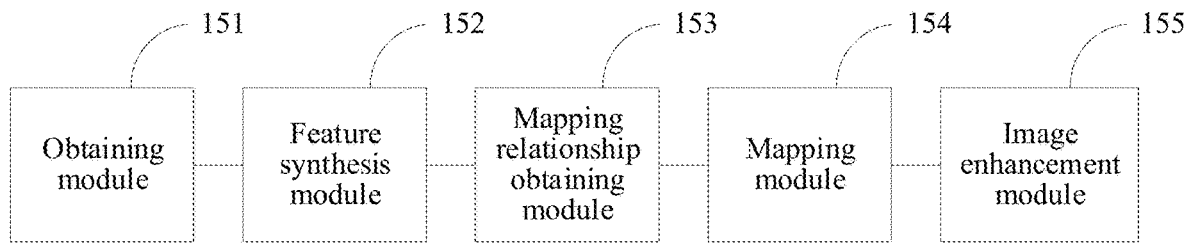
FIG. 15 is a first schematic structural diagram of an image enhancement apparatus according to an embodiment of this disclosure.

For example, as shown in FIG. 15, the image enhancement apparatus may include an obtaining module 151, a feature synthesis module 152, a mapping relationship obtaining module 153, a mapping module 154, and an image enhancement module 155.

The obtaining module 151 is configured to obtain an original image.

The feature synthesis module 152 is configured to perform synthesis processing on features of the original image to obtain a first illumination map corresponding to the original image, a resolution of the first illumination map being lower than a resolution of the original image.

The mapping relationship obtaining module 153 is configured to obtain, based on the first illumination map, a mapping relationship for mapping an image to a second illumination map.

The mapping module 154 is configured to perform mapping processing on the original image based on the mapping relationship to obtain a second illumination map, a resolution of the second illumination map being equal to the resolution of the original image.

The image enhancement module 155 is configured to perform image enhancement processing on the original image according to the second illumination map to obtain a target image.

Figure 16:
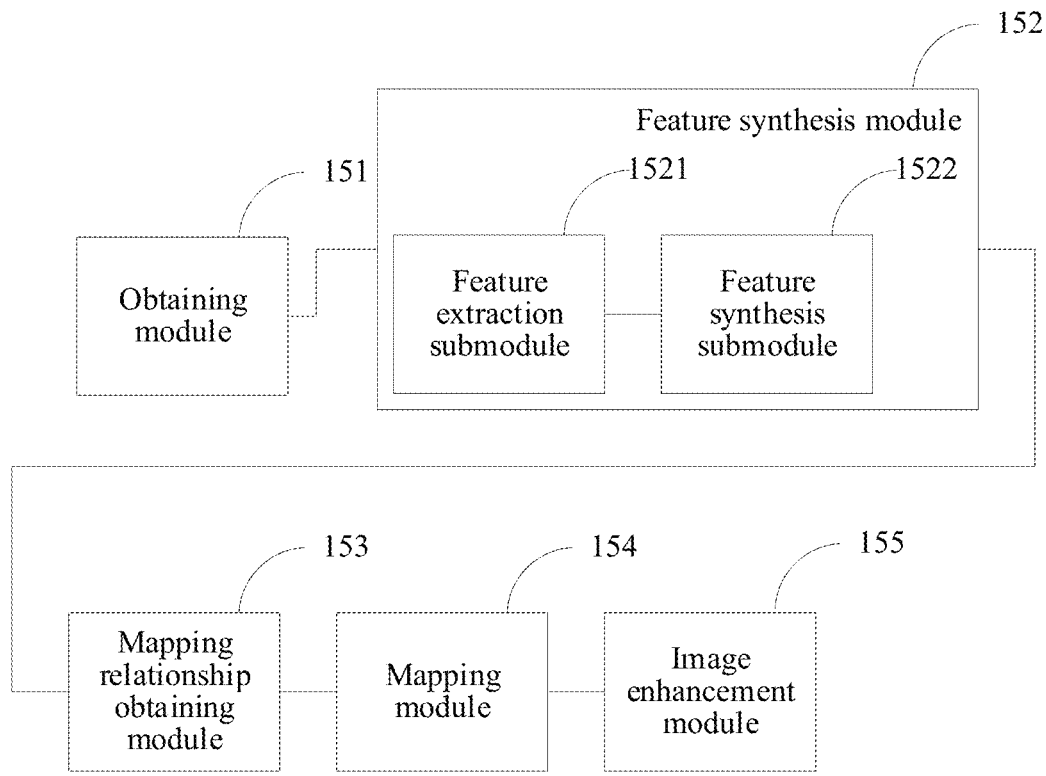
FIG. 16 is a second schematic structural diagram of an image enhancement apparatus according to an embodiment of this disclosure.

In an embodiment, referring to FIG. 16, the feature synthesis module 152 may include:
- a feature extraction submodule 1521, configured to extract a local feature and a global feature of the original image based on a convolutional network; and
- a feature synthesis submodule 1522, configured to perform feature synthesis on the local feature and the global feature to obtain the first illumination map corresponding to the original image.

During specific implementation, the foregoing units may be implemented as independent entities, may be combined in different manners, or may be implemented as the same entity or several entities. For specific implementation of the foregoing units, refer to the foregoing method embodiments. Details are not described herein again.

It can be known from the above that, in the embodiments of this disclosure, the obtaining module 151 obtains an original image; the feature synthesis module 152 performs synthesis processing on features of the original image to obtain a first illumination map corresponding to the original image, a resolution of the first illumination map being lower than a resolution of the original image; the mapping relationship obtaining module 153 obtains, based on the first illumination map, a mapping relationship for mapping an image to a second illumination map; the mapping module 154 performs mapping processing on the original image based on the mapping relationship to obtain a second illumination map, a resolution of the second illumination map being equal to the resolution of the original image; and the image enhancement module 155 performs image enhancement processing on the original image according to the second illumination map to obtain a target image. This solution enhances an image by deep learning, which improves the efficiency and accuracy of image enhancement. Regression learning is also performed on the original image and the annotated illumination map to obtain the network model required for image enhancement, which makes the training of the network model easier, strengthens the robustness of the network model, and makes it convenient for further operations on the image. In addition, the three loss functions are designed to improve the accuracy of the enhanced image in terms of color and contrast. By constraining the illumination map in the network model training process, the image is not to be over-exposed or over-enhanced.

Figure 17:
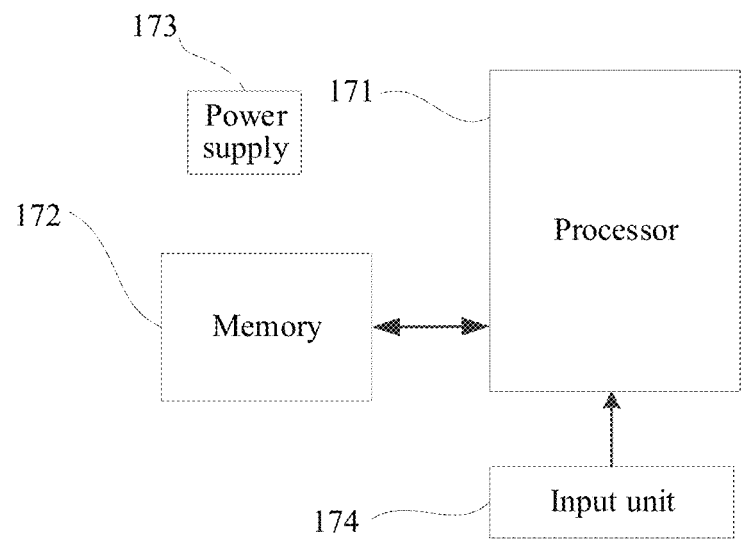
FIG. 17 is a schematic diagram of a network device according to an embodiment of this disclosure.

An embodiment of this disclosure further provides a computer device, which may be a server, a terminal or another device. The computer device is integrated with any image enhancement apparatus provided in the embodiments of this disclosure, such as the network device described above. FIG. 17 is a schematic structural diagram of a computer device according to an embodiment of this disclosure.

Specifically, the computer device may include components such as a processor 171 including one or more processing cores, a memory 172 including one or more computer-readable storage media, a power supply 173, and an input unit 174. A person skilled in the art may understand that the structure of the computer device shown in FIG. 17 does not constitute a limitation to the network device, and the device may include more components or fewer components than those shown in the figure, or some components may be combined, or a different component deployment may be used.

The processor 171 is a control center of the computer device, and connects various parts of the entire computer device using various interfaces and lines. By running or executing software programs and/or modules stored in the memory 172, and invoking data stored in the memory 172, the processor performs various functions and data processing of the computer device, thereby performing overall monitoring on the computer device. Optionally, the processor 171 may include one or more processing cores. Preferably, the processor 171 may integrate an application processor and a modem processor. The application processor mainly processes an operating system, a user interface, an application program, and the like, and the modem processor mainly processes wireless communication. It may be understood that alternatively, the modem processor may not be integrated into the processor 171.

The memory 172 may be configured to store a software program and a module, and the processor 171 runs the software program and the module that are stored in the memory 172, to implement various functional applications and data processing. The memory 172 may mainly include a program storage area and a data storage area. The program storage area may store an operating system, an application program required by at least one function (such as a sound playing function and an image display function), and the like. The data storage area may store data created according to use of the network device, and the like. In addition, the memory 172 may include a high-speed random access memory, and may further include a non-volatile memory, such as at least one magnetic disk storage device, a flash memory device or other non-volatile solid state storage devices. Correspondingly, the memory 172 may further include a memory controller, so that the processor 171 can access the memory 172.

The computer device further includes the power supply 173 supplying power to the components. The power supply 173 may be logically connected to the processor 171 using a power management system, thereby implementing functions such as charging, discharging, and power consumption management using the power management system. The power supply 173 may further include one or more of a direct current or alternating current power supply, a recharging system, a power failure detection circuit, a power supply converter or inverter, a power supply state indicator, and any other component.

The computer device may further include the input unit 174. The input unit 174 may be configured to receive input digit or character information and generate keyboard, mouse, joystick, optical, or trackball signal input related to user settings and function control.

Although not shown in the figure, the computer device may further include a display unit, and the like. Details are not described herein again. Specifically, in this embodiment, the processor 171 in the computer device may load executable files corresponding to processes of one or more application programs to the memory 172 according to the following instructions, and the processor 171 runs the application programs stored in the memory 172, to implement various functions:

obtaining an original image; performing synthesis processing on features of the original image to obtain a first illumination map corresponding to the original image, a resolution of the first illumination map being lower than a resolution of the original image; obtaining, based on the first illumination map, a mapping relationship for mapping an image to a second illumination map; performing mapping processing on the original image based on the mapping relationship to obtain a second illumination map, a resolution of the second illumination map being equal to the resolution of the original image; and performing image enhancement processing on the original image according to the second illumination map to obtain a target image.

For specific implementations of the above operations, refer to the foregoing embodiments. Details are not described herein again.

It can be known from the above that, in the embodiments of this disclosure, an original image is obtained; synthesis processing is performed on features of the original image to obtain a first illumination map corresponding to the original image, a resolution of the first illumination map being lower than a resolution of the original image; a mapping relationship for mapping an image to a second illumination map is obtained based on the first illumination map; mapping processing is performed on the original image based on the mapping relationship to obtain a second illumination map, a resolution of the second illumination map being equal to the resolution of the original image; and image enhancement processing is performed on the original image according to the second illumination map to obtain a target image. This solution enhances an image by deep learning, which improves the efficiency and accuracy of image enhancement. Regression learning is also performed on the original image and the annotated illumination map to obtain the network model required for image enhancement, which makes the training of the network model easier, strengthens the robustness of the network model, and makes it convenient for further operations on the image. In addition, the three loss functions are designed to improve the accuracy of the enhanced image in terms of color and contrast. By constraining the illumination map in the network model training process, the image is not to be over-exposed or over-enhanced.

A person of ordinary skill in the art may understand that, all or some steps of the methods in the foregoing embodiments may be implemented using instructions, or implemented through instructions controlling relevant hardware, and the instructions may be stored in a computer-readable storage medium and loaded and executed by a processor.

Accordingly, an embodiment of this disclosure provides a storage medium, storing a plurality of instructions. The instructions can be loaded by a processor, to perform the steps in any image enhancement method according to the embodiments of this disclosure. For example, the instructions may perform the following steps:

obtaining an original image; performing synthesis processing on features of the original image to obtain a first illumination map corresponding to the original image, a resolution of the first illumination map being lower than a resolution of the original image; obtaining, based on the first illumination map, a mapping relationship for mapping an image to a second illumination map; performing mapping processing on the original image based on the mapping relationship to obtain a second illumination map, a resolution of the second illumination map being equal to the resolution of the original image; and performing image enhancement processing on the original image according to the second illumination map to obtain a target image.

For specific implementations of the above operations, refer to the foregoing embodiments. Details are not described herein again.

The storage medium may include a read-only memory (ROM), a random access memory (RAM), a magnetic disk, an optical disc, or the like.

Because the instructions stored in the storage medium may perform the steps of any image enhancement method provided in the embodiments of this disclosure, the instructions can implement beneficial effects that can be implemented by any image enhancement method provided in the embodiments of this disclosure. For details, reference may be made to the foregoing embodiments. Details are not described herein again.

The image enhancement method and apparatus, and the storage medium provided in the embodiments of this disclosure are described above in detail. Although the principles and implementations of this disclosure are described using specific examples in this specification, the descriptions of the foregoing embodiments are merely intended to help understand the method and the core idea of the method of this disclosure. Meanwhile, a person skilled in the art may make modifications to the specific implementations and application range according to the idea of this disclosure. In conclusion, the content of this specification is not to be construed as a limitation to this disclosure.

What is claimed is:

1. An image enhancement method, performed by a network device, comprising:

obtaining an original image;

performing synthesis processing on features of the original image to obtain a first illumination map corresponding to the original image, a resolution of the first illumination map being lower than a resolution of the original image;

obtaining, based on the first illumination map, a mapping relationship between an image and an illumination map;

generating a second illumination map from the original image based on the mapping relationship, a resolution of the second illumination map being equal to the resolution of the original image; and performing image enhancement processing on the original image according to the second illumination map to obtain a target image.

2. The image enhancement method of claim 1, wherein the performing the synthesis processing on the features of the original image to obtain the first illumination map comprises:

extracting a local feature and a global feature of the original image using a convolutional network; and performing feature synthesis on the local feature and the global feature to obtain the first illumination map corresponding to the original image.

3. The image enhancement method of claim 2, wherein the extracting the local feature and the global feature of the original image using the convolutional network comprises:

inputting the original image to the convolutional network, the convolutional network comprising a primary feature extraction network, a local feature extraction network, and a global feature extraction network, the local feature extraction network and the global feature extraction network being connected in parallel, and the local feature extraction network and the global feature extraction network being connected in series with the primary feature extraction network;

performing a convolution operation on the original image using the primary feature extraction network to extract a primary feature of the original image;

performing a convolution operation on the primary feature using the local feature extraction network to extract the local feature; and performing a convolution operation on the primary feature using the global feature extraction network to extract the global feature.

4. The image enhancement method of claim 1, wherein the performing the synthesis processing on the features of the original image to obtain the first illumination map comprises:

downsampling pixels of the original image to obtain an input image; and performing synthesis processing on features of the input image to obtain the first illumination map corresponding to the original image.

5. The image enhancement method of claim 1, wherein the performing the mapping processing on the original image based on the mapping relationship to obtain the second illumination map comprises:

performing mapping processing on the original image based on the mapping relationship to obtain a mapped image; and upsampling the mapped image to obtain the second illumination map.

6. The image enhancement method of claim 1, wherein the obtaining the mapping relationship comprises:

obtaining, based on a preset training image and a sample enhanced image corresponding to the preset training image, the mapping relationship that enables contrast loss information between a predicted enhanced image corresponding to the preset training image and the sample enhanced image to meet a preset condition, the predicted enhanced image being an enhanced image obtained by performing mapping processing on the preset training image based on the mapping relationship.

7. The image enhancement method of claim 6, wherein the contrast loss information is obtained by calculating an Euclidean distance between the predicted enhanced image and the sample enhanced image.

8. The image enhancement method of claim 1, wherein the obtaining the mapping relationship comprises:

obtaining, based on a preset training image and a sample enhanced image corresponding to the preset training image, the mapping relationship that enables smoothness loss information between a predicted enhanced image corresponding to the preset training image and the sample enhanced image to meet a preset condition, the predicted enhanced image being an enhanced image obtained by performing mapping processing on the preset training image based on the mapping relationship.

9. The image enhancement method of claim 8, wherein the smoothness loss information is obtained by summing spatial variations of values of three color channels at each pixel of the mapping relationship.

10. The image enhancement method of claim 1, wherein the obtaining a mapping relationship for mapping an image to a second illumination map comprises:

obtaining, based on a preset training image and a sample enhanced image corresponding to the preset training image, the mapping relationship that enables color loss information between a predicted enhanced image corresponding to the preset training image and the sample enhanced image to meet a preset condition, the predicted enhanced image being an enhanced image obtained by performing mapping processing on the preset training image based on the mapping relationship.

11. The image enhancement method of claim 10, wherein the color loss information is obtained by similarities between color vectors of each pixel in the predicted enhanced image and in the sample enhanced image.

12. An image enhancement apparatus, comprising:

a memory operable to store computer-readable instructions; and a processor operable to read the computer-readable instructions, the processor, when executing the computer-readable instructions, is configured to:

obtain an original image;

perform synthesis processing on features of the original image to obtain a first illumination map corresponding to the original image, a resolution of the first illumination map being lower than a resolution of the original image;

obtain, based on the first illumination map, a mapping relationship between an image and an illumination map;

generate a second illumination map from the original image based on the mapping relationship, a resolution of the second illumination map being equal to the resolution of the original image; and perform image enhancement processing on the original image according to the second illumination map to obtain a target image.

13. The image enhancement apparatus of claim 12, wherein the processor is configured to:

extract a local feature and a global feature of the original image using a convolutional network; and perform feature synthesis on the local feature and the global feature to obtain the first illumination map corresponding to the original image.

14. The image enhancement apparatus of claim 13, wherein the processor is configured to:

input the original image to the convolutional network, the convolutional network comprising a primary feature extraction network, a local feature extraction network, and a global feature extraction network, the local feature extraction network and the global feature extraction network being connected in parallel, and the local feature extraction network and the global feature extraction network being connected in series with the primary feature extraction network;

perform a convolution operation on the original image using the primary feature extraction network to extract a primary feature of the original image;

perform a convolution operation on the primary feature using the local feature extraction network to extract the local feature; and perform a convolution operation on the primary feature using the global feature extraction network to extract the global feature.

15. The image enhancement apparatus of claim 12, wherein the processor is configured to:

downsample pixels of the original image to obtain an input image; and perform synthesis processing on features of the input image to obtain the first illumination map corresponding to the original image.

16. The image enhancement apparatus of claim 12, wherein the processor is configured to:
perform mapping processing on the original image based on the mapping relationship to obtain a mapped image; and
upsample the mapped image to obtain the second illumination map.

17. The image enhancement apparatus of claim 12, wherein the processor is configured to:
obtain, based on a preset training image and a sample enhanced image corresponding to the preset training image, the mapping relationship that enables contrast loss information between a predicted enhanced image corresponding to the preset training image and the sample enhanced image to meet a preset condition, the predicted enhanced image being an enhanced image obtained by performing mapping processing on the preset training image based on the mapping relationship.

18. The image enhancement apparatus of claim 12, wherein the processor is configured to:
obtain, based on a preset training image and a sample enhanced image corresponding to the preset training image, the mapping relationship that enables smoothness loss information between a predicted enhanced image corresponding to the preset training image and the sample enhanced image to meet a preset condition, the predicted enhanced image being an enhanced image obtained by performing mapping processing on the preset training image based on the mapping relationship.

19. The image enhancement apparatus of claim 12, wherein the processor is configured to:
obtaining, based on a preset training image and a sample enhanced image corresponding to the preset training image, the mapping relationship that enables color loss information between a predicted enhanced image corresponding to the preset training image and the sample enhanced image to meet a preset condition, the predicted enhanced image being an enhanced image obtained by performing mapping processing on the preset training image based on the mapping relationship.

20. A non-transitory computer-readable storage medium, having processor executable instructions stored thereon for causing a processor to perform operations comprising:
obtaining an original image;
performing synthesis processing on features of the original image to obtain a first illumination map corresponding to the original image, a resolution of the first illumination map being lower than a resolution of the original image;
obtaining, based on the first illumination map, a mapping relationship between an image and an illumination map;
generating a second illumination map from the original image based on the mapping relationship, a resolution of the second illumination map being equal to the resolution of the original image; and
performing image enhancement processing on the original image according to the second illumination map to obtain a target image.

* * * * *